United States Patent
Smith et al.

(10) Patent No.: US 7,799,835 B2
(45) Date of Patent: Sep. 21, 2010

(54) RECYCLING AND REDUCTION OF PLASTICS AND NON-PLASTICS MATERIAL

(75) Inventors: Peter Anthony Smith, Stafford (GB); Adam J. Koffler, St. Louis Park, MN (US); Philip Mark Smith, Stafford (GB)

(73) Assignee: Next-Tec, Ltd., Telford, Shorshires (GB)

( * ) Notice: Subject to any disclaimer, the term of this patent is extended or adjusted under 35 U.S.C. 154(b) by 548 days.

(21) Appl. No.: 10/793,184

(22) Filed: Mar. 4, 2004

(65) Prior Publication Data

US 2004/0235970 A1 Nov. 25, 2004

(30) Foreign Application Priority Data

Mar. 13, 2003 (GB) .................................. 0305738.7

(51) Int. Cl.
*C08J 11/04* (2006.01)

(52) U.S. Cl. ................. 521/40; 521/40.5; 521/41; 521/48; 521/48.5; 250/316.1; 250/330; 250/338.1; 250/338.5; 250/339.01; 250/339.09; 250/339.12; 250/341.1; 250/341.5; 250/341.6; 528/480; 528/481; 528/502 R; 528/502 F; 528/503; 264/37.1; 209/552; 209/576; 209/577

(58) Field of Classification Search ................. 521/45.5, 521/46.5, 40, 40.5, 41, 42, 42.5, 46, 48, 48.5; 264/918, 913, 37.1; 219/60; 250/316.1, 250/330, 338.1, 338.5, 339.01, 339.09, 339.11, 250/339.12, 340, 341.1, 341.5; 528/480, 528/481, 502 R, 502 F, 503; 209/552, 576, 209/577

See application file for complete search history.

(56) References Cited

U.S. PATENT DOCUMENTS

| | | | | |
|---|---|---|---|---|
| 3,752,631 | A | 8/1973 | Corbett et al. | ........... 425/324.1 |
| 3,883,624 | A | 5/1975 | McKenzie et al. | ....... 264/37.32 |
| 4,033,907 | A | 7/1977 | Wolf | |
| 4,504,436 | A | 3/1985 | Louvier | ...................... 264/321 |
| 5,199,652 | A * | 4/1993 | Mikofalvy et al. | ............ 241/20 |
| 5,303,826 | A * | 4/1994 | Buzga | ......................... 209/46 |
| 5,472,997 | A * | 12/1995 | Koslowski et al. | .......... 523/307 |

(Continued)

FOREIGN PATENT DOCUMENTS

EP 0916408 A2 5/1999

(Continued)

OTHER PUBLICATIONS

Infrared Spectroscopy http://www.cem.msu.edu, pp. 1-8 Apr. 21, 2008.*

(Continued)

*Primary Examiner*—Ling-Siu Choi
*Assistant Examiner*—Frances Tischler
(74) *Attorney, Agent, or Firm*—Schwegman, Lundberg & Woessner, P.A.

(57) ABSTRACT

The present invention provides, e.g., methods to recycle and/or reduce plastic, non-plastic, or a combination thereof, from a waste stream. The methods of the present invention include contacting the plastic waste with infrared (IR) energy at one or more frequencies and at one or more intensities, over a period of time effective to heat plastic present in the plastic waste.

74 Claims, 2 Drawing Sheets

U.S. PATENT DOCUMENTS

| | | | |
|---|---|---|---|
| 5,512,752 A * | 4/1996 | Aikawa et al. | 250/339.12 |
| 6,248,283 B1 | 6/2001 | Tanaka | 264/413 |
| 6,310,686 B1 * | 10/2001 | Jiang | 356/301 |
| 6,522,149 B2 * | 2/2003 | Yokoyama et al. | 324/453 |
| 6,528,546 B2 * | 3/2003 | Lee et al. | 521/48 |
| 6,610,981 B2 * | 8/2003 | Sommer, Jr. | 250/339.06 |
| 7,135,546 B1 * | 11/2006 | Vandenhende et al. | 528/500 |
| 2001/0045518 A1 * | 11/2001 | Sommer, Jr. | 250/339.06 |

FOREIGN PATENT DOCUMENTS

| | | |
|---|---|---|
| EP | 1188491 A1 | 3/2002 |
| JP | 09-297114 * | 5/1996 |
| WO | WO-9314915 A2 | 8/1993 |
| WO | WO-9400241 A1 | 1/1994 |
| WO | WO-9521731 A1 | 8/1995 |
| WO | WO-9622867 A1 | 8/1996 |

OTHER PUBLICATIONS

Pavia, Lampman and Kritz, "Introduction to Spectroscopy, Guide for Students of Organic Chemistry" pp. 24-28, ISBN 0-7216-7119-5, Sounders College Publishing 1979.*

DeGaspari, "Infrared Recycler", Mechanical Engineering Magazine, Apr. 2000, pp. 60-62: http://www.memagazine.org/backissues/membersonly/april00/features/infrared/infrared.html.*

"Application Serial No. Office Action Mailed Oct. 16, 2009", 2 pgs.

"Israeli Application Serial No. 170801, Office Action mailed Sep. 16, 2009", 2 pgs.

* cited by examiner

RECYCLING AND REDUCTION OF PLASTICS AND NON-PLASTICS MATERIAL

RELATED APPLICATIONS

This application claims priority to U.K. Provisional Patent Application Ser. No. 0305738.7, filed on 13 Mar., 2003; which is incorporated herein it its entirety.

BACKGROUND OF THE INVENTION

The plastic production process begins by heating the hydrocarbons in a "cracking process." Here, in the presence of a catalyst, larger molecules are broken down into smaller ones such as ethylene (ethene) $C_2H_4$, propylene (propene) $C_3H_6$, and butene $C_4H_8$ and other hydrocarbons. The yield of ethylene is controlled by the cracking temperature and is more than 30% at 850° C. and such products as styrene and vinylchloride can be produced in subsequent reactions. These are the starting materials for several other types of plastics. Therefore, this process results in the conversion of the natural gas or crude oil components into monomers such as ethylene, propylene, butene and styrene.

These monomers are then polymerized. Different combinations of monomers yield plastic resins with different properties and characteristics. Each monomer yields a plastic resin with different properties and characteristics. Combinations of monomers produce copolymers with further property variations.

The resulting resins may be molded or formed to produce several different kinds of plastic products with application in many major markets. The variability of resin permits a compound to be tailored to a specific design or performance requirement. This is why certain plastics are best suited for some applications while others are best suited for entirely different applications. For instance, impact strength measures the ability of a material to withstand shock loading. Heat resistance protects the resin from exposure to excessive temperatures. Chemical resistance protects the resin from breakdown due to exposure to environmental chemicals.

Even though the basic makeup of many polymers is carbon and hydrogen, other elements can also be involved. Oxygen, chlorine, fluorine, nitrogen, silicon, phosphorous, and sulfur are other elements that are found in the molecular makeup of polymers. Polyvinyl chloride (PVC) contains chlorine. Nylon contains nitrogen. Teflon contains fluorine. Polyester and polycarbonates contain oxygen. There are also some polymers that, instead of having a carbon backbone, have a silicon or phosphorous backbone and these are considered inorganic polymers.

Polymers produced on a large scale such as polystyrene, polyvinyl chloride (PVC), polyethylene co-vinylacetate, polyacrylic acid, and styrene and butadiene rubber, are created using heterogeneous dispersion polymerization. In this process, polymers form in two phases in which the initial monomer or the resulting polymer, or both, are finely dispersed in a solvent and are controlled by adding a surfactant (stabilizer) that conforms particle sizes to within a relatively narrow range. Once the polymers are formed, manufacturers remove the water or evaporate the solvents used to disperse the polymers. Companies then face the challenge of properly disposing of and remediating these harmful by-products, a daunting task as EPA regulations grow more stringent. In 1992, the U.S. plastics industry produced 567 million pounds of toxic waste, according to the EPA. In the same year, companies put about one-quarter of their total waste back into the nation's environment.

It is generally desirable to recycle/re-use plastics materials. Aside from preserving resources, significant costs and taxes can be incurred in dumping such materials.

Plastic is more than just a landfill problem. The more than 75 billion pounds of plastic products and packaging produced in the United States every year poses a wide variety of dangers to human health and the environment. At every step in the production of plastics, hazardous substances are used and hazardous wastes are produced. Plastics are made from finite, nonrenewable petroleum and natural gas. Production of plastic products and packaging is one of the most chemically intensive activities. According to the U.S. Environmental Protection Agency (EPA), 35 of the 47 chemical plants ranked highest in carcinogenic emissions are involved in plastic production. Workers at these chemical refineries (along with nearby residents), are at increased risk of injury or death due to toxic emissions and/or chemical explosions. Plastics contain additives (i.e. colorants, stabilizers, and plasticizers) that may include toxic constituents such as cadmium and lead. Some plastic chemicals, such as ethylene dichloride and vinyl chloride used to produce vinyl are considered to be carcinogenic. They may also trigger other health problems such as liver, kidney and neurological damage. Chemicals in plastics may reduce sperm counts. A panel convened by the National Institutes of Health found that the most commonly used plasticizer, DEHP, was a developmental toxin. Studies showed that male rodents exposed to DEHP had decreased sperm levels. DEHP, which is used in plastic food packaging, children's toys and medical devices, has the potential to leach out of plastics. Exposure can occur through breathing, ingestion and possibly through absorption of the skin.

Plastic litter and waste represents a significant and growing cost to the state, local government and ultimately ratepayers and taxpayers. California's annual garbage bill for cleaning up and landfilling plastic waste is conservatively estimated at more than $750 million annually. Studies show that plastic represents 50 to 80 percent of the volume of litter collected from roads, parks and beaches, and 90 percent of floating litter in the marine environment. State and local agencies spend millions picking up litter each year, of which plastic is often the largest component. Last year California Transportation alone spent $16 million cleaning up litter on California highways. This sum excludes the costs incurred by volunteers and businesses participating in the Adopt-a-Highway program. California's total cleanup cost for plastic litter and waste cleanup will easily top one billion dollars in 2004.

Of hundreds of varieties of plastic, just six are used in 60 percent of plastic production, including at least 90 percent of plastic packages and containers. Polyethylene terephthalate (PET or PETE) is found in beverage, mouthwash, peanut butter and salad dressing bottles; in TV dinner trays and plastic wrap. Recycled PETE is used to make clothing fibers, tote bags, furniture, carpet and new beverage containers. High density polyethylene (HDPE) is found in milk, water and juice bottles, trash and shopping bags; and in detergent, yogurt and margarine containers. Recycled HDPE is used to make detergent, oil and vitamin bottles, drain pipes, recycling bins, dog houses, and other plastic lumber. Polyvinyl chloride (PVC) is used to make clear food packages, shampoo bottles, toiletry and medicine tubes. Recycled PVC is used to make packaging, binders, mats, decks, paneling, roadway gutters, mud flaps and speed bumps. Low density Polyethylene (LDPE) is used to make bread bags, frozen food bags and squeezable bottles. Recycled LDPE is used to make mailing envelopes, trash cans, trash liners, furniture, floor tiles, paneling and compost bins and lumber. Polypropylene (PP) is used in ketchup, medicine and dairy product containers.

Recycled PP is used to make signal lights, car battery components, brooms, brushes, oil funnels, ice scrapers, bike racks, pallets, storage bins and trays. Polystyrene (PS) is used to make packing foam, egg cartons, meat trays, aspirin bottles, plates, CD jackets and food service items. Recycled PS is used to make thermometers, switch plates, insulation, egg cartons, vents, office supplies, foam packaging and containers.

Of these six plastics, there are widespread recycling opportunities for just two: PET and HDPE. Together, those resins accounted for more than 94 percent of all the plastic bottles made in the United States in 1998. But even with these, there are limits to recycling opportunities. Most plastics cannot be economically retrieved in sufficient quantities to support a recycling market. Because of their varying physical and chemical properties, different plastics generally cannot be mixed together when they are reprocessed without damaging them. Many residential recycling programs can only accept PET and HDPE beverage containers. Frozen food trays, margarine tubs and other food containers come in too many colors to be cost effectively collected in most communities.

A number of problems can be encountered in attempting to recycle/re-use plastics material. Such waste material tends to have a very high relative volume and hence can incur significant transport costs. Problems can also be encountered with contaminants and also mixtures of different materials. Problems can also be encountered with disposing of various types of waste which include plastics material such as used syringes and other "red waste" from hospitals and other medical establishments. Such materials must clearly be disposed of safely and without risk to persons handling them.

SUMMARY OF THE INVENTION

The present invention provides a method to recycle plastic from a waste stream. The present invention also provides a method to recycle non-plastic from a waste stream. The present invention also provides a method to recycle plastic, non-plastic, or a combination thereof, from a waste stream. The present invention provides a method to reduce plastic from a waste stream. The present invention also provides a method to reduce non-plastic from a waste stream. The present invention also provides a method to reduce plastic, non-plastic, or a combination thereof, from a waste stream. The present invention also provides a method to reduce and recycle plastic from a waste stream. The present invention also provides a method to reduce and recycle non-plastic from a waste stream. The present invention also provides a method to reduce and recycle non-plastic and plastic from a waste stream. The present invention also provides a method to dehydrate a waste stream. The present invention also provides a method to dehydrate plastic waste. The present invention also provides a method to dehydrate non-plastic waste. The present invention also provides a method to alter physical properties of a waste stream. The present invention also provides a method to alter physical properties of plastic waste. The present invention also provides a method to alter physical properties of non-plastic waste. The present invention also provides a method to alter physical properties of plastic waste, non-plastic waste, or a combination thereof. The present invention also provides a method to chemically alter a waste stream. The present invention also provides a method to chemically alter plastic waste. The present invention also provides a method to chemically alter non-plastic waste. The present invention also provides a method to chemically alter plastic waste, non-plastic waste, or a combination thereof. The present invention also provides a method to sterilize a waste steam. The present invention also provides a method to sterilize plastic waste. The present invention also provides a method to sterilize non-plastic waste. The present invention also provides a method to render a waste stream chemically inert. The present invention also provides a method to render plastic waste chemically inert. The present invention also provides a method to render non-plastic waste chemically inert. The waste stream can include plastic, non-plastic, or a combination thereof. Additionally, the material can include plastic, non-plastic, or a combination thereof.

The methods of the present invention include: (a) optionally separating a waste stream that includes plastic waste, such that at least a portion of non-plastic waste, unplasticized polyvinyl chloride (UPVC), plastics treated with a fire retardant, or a combination thereof is separated from the waste stream, thereby providing a plastic waste; (b) optionally reducing the size of the plastic waste; (c) optionally analyzing the plastic waste; (d) optionally removing solid particles, organic matter, contaminants, metal contaminants, or a combination thereof, from the plastic waste; (e) optionally calibrating an infrared (IR) source to the plastic waste; (f) contacting the plastic waste with infrared (IR) energy at one or more frequencies and at one or more intensities, over a period of time effective to heat plastic present in the plastic waste; (g) optionally contacting the plastic waste with infrared (IR) energy at one or more frequencies and at one or more intensities, over a period of time effective to alter the volume of the plastic waste; (h) optionally contacting the plastic waste with infrared (IR) energy at one or more frequencies and at one or more intensities, over a period of time effective to reduce the weight of the plastic waste; and (i) optionally cooling the heated plastic waste.

The methods of the present invention include contacting plastic waste with infrared (IR) energy at one or more frequencies and at one or more intensities, over a period of time effective to heat plastic present in the plastic waste. The methods optionally include, prior to contacting the plastic waste with the IR energy, separating a waste stream that includes plastic waste, such that at least a portion of non-plastic waste, unplasticized polyvinyl chloride (UPVC), plastics treated with a fire retardant, or a combination thereof is separated from the waste stream, thereby providing a plastic waste. The methods also optionally include, prior to contacting the plastic waste with the IR energy, reducing the size of the plastic waste. The methods also optionally include, prior to contacting the plastic waste with the IR energy, analyzing the plastic waste. The methods also optionally include, prior to contacting the plastic waste with the IR energy, removing solid particles, organic matter, contaminants, metal contaminants, or a combination thereof, from the plastic waste. The methods also optionally include, prior to contacting the plastic waste with the IR energy, calibrating an infrared (IR) source to the plastic waste. The methods optionally include, subsequent to contacting the plastic waste with the IR energy, contacting the plastic waste with infrared (IR) energy at one or more frequencies and at one or more intensities, over a period of time effective to alter the volume of the plastic waste. The methods also optionally include, subsequent to contacting the plastic waste with the IR energy, contacting the plastic waste with infrared (IR) energy at one or more frequencies and at one or more intensities, over a period of time effective to reduce the weight of the plastic waste. The methods also optionally include, subsequent to contacting the plastic waste with the IR energy, cooling the heated plastic waste.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. Reference numbers are the same for those elements that are the same across different Figures. For example, 3 depicting the waste stream can be located in FIG. 1. However, reference numbers are the same for those elements that are the same across different Figures. In the drawings.

DETAILED DESCRIPTION OF THE INVENTION

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention relates to novel methods to recycle waste material that includes plastic are provided, as well as novel methods to obtain recycled plastic from waste material that includes plastic. When describing the methods, products obtained from such methods, formulations that include such products, and methods of using such products, the following terms have the following meanings, unless otherwise indicated.

Definitions

As used herein, "plastic" refers to any of various organic compounds produced by polymerization, capable of being molded, extruded, cast into various shapes and films, or drawn into filaments used as textile fibers. A specified plastic can either be a thermosetting polymer or a thermoplastic polymer. Specifically, the plastic can include acetals, acrylics, acrylonitrile-butadiene-styrene, alkyds, cellulosics, coumarone-indene, diallyl phthalate, epoxy, fluoropolymer, melamine-formaldehyde, nitrile resins, nylon, petroleum resins, phenolics, polyamide-imide, polyarylates, polybutylene, polycarbonate, polyethylene, polyimides, polyphenylene oxide, polyphenylene sulfide, polypropylene, polystyrene, polyurethanes, polyvinyl acetate, polyvinyl chloride, styrene acrylonitrile, styrene butadiene latexes, sulfone polymers, thermoplastic polyester, unsaturated polyester, urea-formaldehyde, hexachloroethane, or any combination thereof. More specifically, the plastic can include polyethylene terephthalate (PET or PETE), high density polyethylene (HDPE), polyvinyl chloride (PVC), low density polyethylene (LDPE), polypropylene (PP), polystyrene (PS), or combinations thereof. The plastic can optionally include one or more additives.

Polymers are typically blended with additives during raw material processing into their finished parts. Additives are incorporated into polymers to alter and improve their basic mechanical, physical or chemical properties. Additives are also used to protect the polymer from the degrading effects of light, heat, or bacteria; to change such polymer properties as flow; to provide product color; and to provide special characteristics such as improved surface appearance or reduced friction. Types of additives include, e.g., antioxidants for outside application, colorants for colored plastic parts, foaming agents for Styrofoam cups and packaging material, fire retardants in computer and other electrical equipment, and plasticizers for use in toys and food processing equipment.

A thermoset refers to a polymer that solidifies or "sets" irreversibly when heated. Thermosets are valued for their durability and strength and are used primarily in automobiles and construction, although applications such as adhesives, inks, and coatings are also significant. Other examples of thermoset plastics and their product applications include: polyurethanes used in mattresses, cushions, insulation, ski boots, and toys; unsaturated polyesters used in lacquers, varnishes, boat hulls, and furniture; and epoxies used in glues, coating electrical circuits, and helicopter blades.

A thermoplastic refers to a polymer in which the molecules are held together by weak secondary bonding forces that soften when exposed to heat and return to its original condition when cooled back down to room temperature. When a thermoplastic is softened by heat, it can then be shaped by extrusion, molding or pressing. Thermoplastics offer versatility and a wide range of applications. They make up the greatest share of plastics used in food packaging because they can be rapidly and economically formed into any shape needed to fulfill the packaging function. Examples include milk jugs and soda bottles. Other examples of thermoplastics include polyethylene used in packaging, electrical insulation, milk and water bottles, packaging film, house wrap, and agricultural film; polypropylene used in carpet fibers, automotive bumpers, microwave containers, and external prostheses; and polyvinyl chloride (PVC) used in sheathing for electrical cables, floor and wall coverings, siding, credit cards, and automobile instrument panels.

As used herein, "waste stream" refers to commercial waste, industrial waste, retail waste and/or medical waste, and includes plastic waste, non-plastic waste, unplasticized polyvinyl chloride (UPVC), and/or plastics treated with a fire retardant.

As used herein, "plastic waste" refers to waste material that is at least partially plastic in nature. For example, the waste material can include up to about 100 wt. % plastic, up to about 90 wt. % plastic, up to about 70 wt. % plastic, or up to about 50 wt. % plastic. The waste will include, e.g., commercial waste, industrial waste, retail waste and/or medical waste.

As used herein, "non-plastic waste" refers to waste material that is at least partially non-plastic in nature. For example, the waste material can include up to about 100 wt. % non-plastic, up to about 90 wt. % non-plastic, up to about 70 wt. % non-plastic, or up to about 50 wt. % non-plastic. The waste will include, e.g., commercial waste, industrial waste, retail waste and/or medical waste.

As used herein, "recycled plastic" refers to plastic that has been exposed to infrared (IR) energy at one or more frequencies and at one or more intensities, over a period of time effective to physically and/or chemically modify the plastic present therein. Suitable physical modifications include, e.g., elevating the purity, heating the plastic, melting the plastic, or a combination thereof. Suitable chemical modifications include, e.g., rendering the plastic chemically inert. The recycled plastic can be employed for the same use as the plastic present in the plastic waste, or can be employed for a use different from the plastic present in the plastic waste.

As used herein, "reduced plastic" refers to plastic that has been exposed to infrared (IR) energy at one or more frequencies and at one or more intensities, over a period of time effective to physically and/or chemically modify the plastic present therein. Suitable physical modifications include, e.g., a size reduction, a weight reduction, a volume reduction, or a combination thereof. Suitable chemical modifications include, e.g., chemically degrading plastic present therein, chemically decomposing plastic present therein, or a combination thereof. The reduced plastic can be employed for the same use as the plastic present in the plastic waste, or can be employed for a use different from the plastic present in the plastic waste.

As used herein, "reduced non-plastic" refers to non-plastic that has been exposed to infrared (IR) energy at one or more frequencies and at one or more intensities, over a period of time effective to physically and/or chemically modify the non-plastic present therein. Suitable physical modifications include, e.g., a size reduction, a weight reduction, a volume reduction, or a combination thereof. Suitable chemical modifications include, e.g., chemically degrading non-plastic present therein, chemically decomposing non-plastic present therein, or a combination thereof. The reduced non-plastic can be employed for the same use as the non-plastic present in the plastic waste, or can be employed for a use different from the non-plastic present in the plastic waste.

As used herein, "infrared (IR) energy" refers to electromagnetic waves in the frequency range just below visible light corresponding to radiated heat. IR waves can be generated by a kind of LED and are often used for remote controls for televisions etc. and in some docking stations. IR waves are electromagnetic radiation with wavelengths longer than visible light but shorter than radio waves. IR radiation refers to electromagnetic radiation with wavelengths between 750 nanometers and 1,000,000 nanometers (or 1 millimeter). This is more commonly known as heat energy.

As used herein, "acetal" refers to an engineering thermoplastic produced by the polymerization of purified formaldehyde $[CH_2O]$ into both homopolymer and copolymer types. Typical applications are found in consumer products, automotive parts, and industrial machinery parts.

As used herein, "acrylics" refers to a family of thermoplastic resins of acrylic esters $[CH_2CHCOOR]$ or methacrylic esters $[CH_2C(CH_3)COOR]$. The acrylates may be methyl, ethyl, butyl, or 2-ethylhexyl. Usual methacrylates include the methyl, ethyl, butyl, lauryl and stearyl. Typical applications are found in lighting fixtures, glazing and automotive parts.

As used herein, "acrylonitrile-butadiene-styrene" (ABS) refers to a class of thermoplastic terpolymers including a range of resins, all prepared with usually more than 50% styrene $[C_6H_5CHCH_2]$ and varying amounts of acrylonitrile $[CH_2CHCN]$ and butadiene $[CH_2CHCHCH_2]$. The three components are combined by a variety of methods involving polymerization, graft copolymerization, physical mixtures and combinations thereof. Typical applications are found in appliances, automotive parts, pipe, business machine and telephone components.

As used herein, "alkyds" refer to thermosetting unsaturated polyester resins produced by reacting an organic alcohol with an organic acid, dissolved in and reacted with unsaturated monomers such as styrene $[C_6H_5CHCH_2]$, diallyl phthalate $[C_6H_4(COOCH_2CHCH_2)_2]$, diacetone acrylamide $[CH_3COCH_2C(CH_3)_2CHCHCONH_2]$ or vinyl toluene $[CH_2CHC_6H_4CH_2]$. Typical applications are found in electrical uses, automotive parts, and as coatings.

As used herein, "cellulosics" refer to a family of thermoplastic resins manufactured by chemical modification of cellulose $[(C_6H_{10}O_5)_n]$. Included are: cellophane—regenerated cellulose made by mixing cellulose xanthate [ROCSSH] with a dilute sodium hydroxide [NaOH] solution to form a viscose, then extruding the viscose into an acid bath for regeneration; cellulose acetate—an acetic acid ester $[CH_3COOC_2H_5]$ of cellulose; cellulose acetate butyrate—a mixed ester produced by treating fibrous cellulose with butyric acid $[CH_3CH_2CH_2COOH]$, butyric anhydride $[(CH_3CH_2CH_2CO)_2O]$, acetic acid $[CH_3COOH]$ and acetic anhydride $[(CH_3CO)_2O]$ in the presence of sulfuric acid $[H_2SO_4]$; cellulose propionate—formed by treating fibrous cellulose with propionic acid $[CH_3CH_2CO_2H]$ and acetic acid and anhydrides in the presence of sulfuric acid; cellulose nitrate—made by treating fibrous cellulosic materials with a mixture of nitric $[HNO_3]$ and sulfuric $[H_2SO_4]$ acids. Typical applications are found in packaging, consumer products, and automotive parts.

As used herein, "coumarone-indene" refers to a thermoplastic resin obtained by heating mixtures of coumarone $[C_8H_6O]$ and indene $[C_6H_4CH_2CHCH]$ with sulfuric acid $[H_2SO_4]$ to promote polymerization. These resins have no commercial applications when used alone. They are used primarily as processing aids, extenders and plasticizers with other resins in asphalt floor tile.

As used herein, "diallyl phthalate" (DAP) is a term used both for the monomeric and polymeric forms used in the production of thermosetting molding powders, casting resins and laminates. The monomer $[C_6H_4(COOCH_2CHCH_2)_2]$ is used as a cross-linking agent in unsaturated polyester resins.

As used herein, "epoxy" refers to thermosetting resins that, in the uncured form, contain one or more reactive epoxide or oxirane groups. These epoxide groups serve as cross-linking points in the subsequent curing step, in which the uncured epoxy is reacted with a curing agent or hardener. Cross-linking is accomplished through the epoxide groups as well as through hydroxyl groups that may be present. Most conventional unmodified epoxy resins are produced from epichlorohydrin (chloropropylene oxide) $[CH_2OCHCH_2Cl]$ and bisphenol A $[(CH_3)_2C(C_6H_{40}H)_2]$. The other types of epoxy resins are phenoxy resins, novolac resins, and cycloaliphatic resins. Epoxy resins are used as protective coatings, bonding adhesives, in building and construction, and for electrical, and many other uses.

As used herein, "fluoropolymer" refers to a family of thermoplastic resins analogous to polyethylene in which some of the hydrogen atoms attached to the carbon chain are replaced by fluorine or fluorinated alkyl groups. In some cases, other halogens such as chlorine are also part of the molecule. The most common commercial fluoropolymers include: FEP (fluorinated ethylene-propylene) from tetrafluoroethylene $[C_2F_4]$ and hexa-fluoropropylene $[C_3F_6]$; PTFE (polytetra fluoroethylene) from the polymerization of tetrafluoroethylene and ethylene $[C_2H_4]$; PFA (perfluoroalkoxy) from tetrafluoroethylene and perfluoropropyl vinyl ether $[C_3H_7C_4OF_5]$; PCTFE (polychlorotrifluoro-ethylene) from chlorotrifluoro-ethylene monomer $[C_2F_3Cl]$; CTFE-VDF (polychlorotrifluoroethylenevinylidene fluoride) from chlorotrifluoroethylene and vinylidene fluoride $[C_2H_2F_2]$; E-CTFE (polyethylenechlorotrifluoroethylene) from chlorotrifluoroethylene and ethylene; PVDF (polyvinylidene fluoride) from vinylidene fluoride monomer; and PVF (polyvinyl fluoride) from vinyl fluoride monomer $[C_2H_3F]$. Typical applications for fluoropolymers are found in electrical/electronic uses and pipe and chemical processing equipment.

As used herein, "melamine-formaldehyde" refers to thermosetting resins formed by the condensation reaction of formaldehyde [HCHO] and melamine [$C_3N_3(NH_2)_3$]. The chemistry is analogous to that of ureaformaldehyde except that the three amino groups of melamine provide more possibilities for cross-linking, are more highly reactive, and all six hydrogen atoms of melamine will react, forming the hexamethyl compound. Typical applications are found in bonding and adhesives, coatings, and consumer products.

As used herein, "nitrile resins" refer to thermoplastic resins composed of acrylonitrile [$CH_2CHCN$] along with comonomer such as acrylates, methacrylates, butadiene [$CH_2CHCHCH_2$] and styrene [$C_6H_5CHCH_2$]. Both straight copolymers and copolymers grafted onto elastomeric backbones are available. The unique property of these materials is outstanding resistance to passage of gases and water vapor, making them useful in packaging applications.

As used herein, "nylon" refers to a generic name for a family of long-chain polyamide engineering thermoplastics which have recurring amide groups [—CO—NH—] as an integral part of the main polymer chain. Nylons are synthesized from intermediates such as dicarboxylicacids, diamines, amino acids and lactams, and are identified by numbers denoting the number of carbon atoms in the polymer chain derived from specific constituents, those from the diamine being given first. The second number, if used, denotes the number of carbon atoms derived from a diacid. Commercial nylons are as follows: nylon 4 (polypyrrolidone)-a polymer of 2-pyrrolidone [$CH_2CH_2CH_2C(O)NH$]; nylon 6 (polycaprolactam)-made by the polycondensation of caprolactam [$CH_2(CH_2)_4NHCO$]; nylon 6/6-made by condensing hexamethylenediamine [$H_2N(CH_2)_6NH_2$] with adipic acid [$COOH(CH_2)_4COOH$]; nylon 6/10-made by condensing hexamethylenediamine with sebacic acid[$COOH(CH_2)_8COOH$]; nylon 6/12-made from hexamethylenediamine and a 12-carbon dibasic acid; nylon 11-produced by polycondensation of the monomer 11-amino-undecanoic acid [$NH_2CH_2(CH_2)_9COOH$]; nylon 12-made by the polymerization of laurolactam [$CH_2(CH_2)_{10}CO$) or cyclododecalactam, with 11 methylene units between the linking —NH—CO— groups in the polymer chain. Typical applications for nylons are found in automotive parts, electrical/electronic uses, and packaging.

As used herein, "petroleum resins" refer to thermoplastic resins obtained from a variable mixture unsaturated monomers recovered as byproduct from cracked and distilled petroleum streams. They also contain indene [$C_6H_4CH_2CHCH$], which is copolymerized with a variety of other monomers including styrene [$C_6H_5CHCH_2$], vinyl toluene [$CH_2CHC_6H_4CH_3$], and methyl indene [$C_6H_3CH_3CH_2CHCH$]. Typical applications are found in adhesives, printing inks, rubber compounding, and surface coatings.

As used herein, "phenolic" refers to thermosetting resins in which the basic raw materials are formaldehyde [HCHO] and phenol [$C_6H_5OH$], although almost any reactive phenol or aldehyde can be used. The phenols used commercially are phenol, cresols [$CH_3C_6H_4OH$], xylenols [$(CH_3)_2C_6H_3OH$], p-t-butylphenol [$C_4H_9C_6H_4OH$], p-phenylphenol [$C_6H_5C_6H_4OH$], bisphenols [$(C_6H_4OH)_2$], and resorcinol [$C_6H_4(OH)_2$]. The aldehydes used are formaldehyde and furfural [$C_4H_3OCHO$]. In the uncured and semi-cured condition, phenolic resins are used as adhesives, casting resins, potting compounds, and laminating resins. As molding powders, phenolic resins can be found in electrical uses.

As used herein, "polyamide-imide" refers to engineering thermoplastic resins produced by the condensation reaction of trimellitic anhydride [$OCC_6H_2C_2O_3$] and various aromatic diamines. Typical applications are found in aerospace, automotive and heavy equipment industries.

As used herein, "polyarylates" refer to engineering thermoplastic resins produced by interfacial polymerization of an aqueous solution of the disodium salt of bisphenol A [$(CH_3)_2C(C_6H_4OH)_2$] with phthalic acid chlorides [$C_6H_4(CO)_2Cl_2$] in methylene chloride [$CH_2Cl_2$]. The major use of polyarylates is in outdoor lighting.

As used herein. "polybutylene" refers to thermoplastic resins produced via stereospecific Ziegler-Natta polymerization of butene-1 monomer [$CH_2CHCH_2CH_3$]. Typical applications are found in pipe and packaging film.

As used herein. "polycarbonate" refers to engineering thermoplastic resins produced by (1) phosgenation of dihydric phenols, usually bisphenol A [$(CH_3)_2C(C_6H_{40}H)_2$], (2) ester exchange between diaryl carbonates and dihydric phenols, usually between diphenyl carbonate [$(C_6H_5O)_2CO$] and bisphenol A and (3) interfacial polycondensation of bisphenol A and phosgene[$COCl_2$]. Typical applications are found in glazing, appliances, and electrical uses.

As used herein. "polyethylene" refers to a family of thermoplastic resins obtained by polymerizing the gas ethylene [$C_2H_4$]. Low molecular weight polymers of ethylene are fluids used as lubricants; medium weight polymers are waxes miscible with paraffin; and the high molecular weight polymers (i.e., over 6000) are the materials used in the plastics industry. Polymers with densities ranging from about 0.910 to 0.925 are called low density; those of densities from about 0.926 to 0.940 are called medium density; and those from about 0.941 to 0.965 and over are called high density. The low density types are polymerized at very high pressures and temperatures, and the high density types at relatively low temperatures and pressures. A relatively new type called linear low density polyethylene is manufactured through a variety of processes: gas phase, solution, slurry, or high pressure conversion. A high efficiency catalyst system aids in the polymerization of ethylene and allows for lower temperatures and pressures than those required in making conventional low density polyethylene. Copolymers of ethylene with vinyl acetate, ethyl acrylate, and acrylic acid are commercially important. Major polyethylene applications can be found in packaging, housewares, toys and communications equipment.

Polyethylene is a waxy, translucent, somewhat flexible thermoplastic, prepared by polymerizing ethylene at high pressure (1,000 to 4,000 atm) and high temperature (180° C. to 190° C.) in the presence of a trace of oxygen. Polyethylene is insoluble in all solvents and is resistant to the action of most reagents, other than strong oxidizing acids. Above 115° C., the polymer changes from a clear solid to a relatively low-viscosity melt. At this temperature and above, exposure to air causes relatively extensive oxidative degradation, unless antioxidants are included with the polymer.

Polyethylene is widely used as a film by itself or as a hot extrusion onto paper to provide additional strength and moisture-resistant characteristics. It is also applied to printing papers to provide finish and strength. The material is also made in sheets for use as a facing to prevent materials from sticking to a surface in operations requiring the application of pressure. The film which does not adhere permanently to waxes and many plastics in the unhardened state, is easily peeled off when the operation is completed. In sheet form, it is used in conservation work, in lieu of cellulose acetate lamination, to protect brittle paper, in which case the paper is placed between two sheets of the film, which is then sealed with double-sided adhesive tape around the edges. It may also be sealed by means of plastic welding.

Low molecular weight polymers of ethylene are fluids used as lubricants; medium weight polymers are waxes miscible with paraffin; and high molecular weight polymers (e.g., over 6000) are the materials used in the plastics industry. A relatively new type called linear low density polyethylene (LLDPE) is manufactured through a variety of processes: gas phase, solution, slurry, or high pressure conversion. A high efficiency catalyst system aids in the polymerization of ethylene and allows for lower temperatures and pressures than those required in making conventional low density polyethylene. Copolymers of ethylene with vinyl acetate, ethyl acrylate, and acrylic acid are commercially important. Major polyethylene applications can be found in packaging, housewares, toys and communications equipment.

As used herein, "polyimides" refer to a family of thermoset and thermoplastic resins characterized by repeating imide linkages. There are four types of aromatic polyimides: (1) condensation products made by the reaction pyromellitic dianhydride (PMDA) $[C_6H_2(C_2O_3)_2]$ and aromatic diamines such as 4,4'-diaminodiphenyl ether $[(C_6H_4NH_2)_2O]$; (2) condensation products of 3,4,3',4'-benzophenone tetracarboxylic dianhydride (BTDA) $[(C_6H_5)_2CO(C_{20\ 3})_2]$ and aromatic amines;(3) the reaction of BTDA and a diisocyanate such as 4,4'-methylene-bis(phenylisocyanate) $[OCNC_6H_4CH_2C_6H_4NCO]$; and (4) a polyimide based on diaminophenylindane and a dicarboxylic anhydride such as carbonyldiphthalic anhydride $[OC_6H_4(CO)_2COC_6H_4(CO)_2]$. Thermoset polyimides are produced in condensation polymers that possess reactive terminal groups capable of subsequent cross-linking through an addition reaction. Typical applications for thermoplastic and thermosetting polyimides are transportation and electronics.

As used herein, "polyphenylene oxide, modified" refers to engineering thermoplastic resins produced by the oxidative coupling of 2,6-dimethylphenol $[(CH_3)_2C_6H_3OH]$ (xylenol), then blended with impact polystyrene. Typical applications are found in electrical/electronic uses, business machine parts, appliances, and automotive parts.

As used herein, "polyphenylene sulfide" refers to engineering thermoplastic resins produced by the reaction of p-dichlorobenzene $[C_6H_4Cl_2]$ with sodium sulfide $[Na_2S]$. The major use for polyphenylene sulfide is in electrical/electronic parts and automotive parts.

As used herein, "polypropylene" refers to thermoplastic resins made by polymerizing propylene $[CH_3CHCH_2]$ and in the case of copolymers with monomers, with suitable catalysts, generally aluminum alkyl and titanium tetrachloride mixed with solvents. The monomer unit in polypropylene is asymmetric and can assume two regular geometric arrangements: isotactic, with all methyl groups aligned on the same side of the chain, or syndiotactic, with the methyl groups alternating. All other forms, where this positioning is random, are called atactic. Commercial polypropylene contains 90-97% crystalline or isotactic PP with the remainder being atactic. Most processes remove excess atactic PP. This by-product is used in adhesives, caulks, and cablefilling compounds. Major applications of commercial PP are found in packaging, automotive, appliance and carpeting markets.

As used herein, "polystyrene" refers to high molecular weight thermoplastic resins produced generally by the free-radical polymerization of styrene monomer $[C_6H_5CHCH_2]$ which can be initiated by heating alone but more effectively by heating in the presence of free-radical initiator (such as benzoyl peroxide $[(C_6H_5CO)_2O_2]$. Typical processing techniques are modified mass polymerization or solution polymerization, suspension polymerization, and expandable beads. Major markets for polystyrene are in consumer and institutional products, electrical/electronic uses, and building/construction.

As used herein, "polyurethanes" refer to a large family of polymers based on the reaction product of an organic isocyanate with compounds containing a hydroxyl group. The commonly used isocyanates are toluene diisocyanate (TDI) $[CH_3C_6H_3(NCO)_2]$, methylene diphenyl isocyanate (MDI) $[OCNC_6H_4CH_2C_6H_4NCO]$, and polymeric isocyanates (PMDI), obtained by the phosgenation of polyamines derived from the condensation of aniline $[C_6H_5NH_2]$ with formaldehyde [HCHO]. Polyols (with hydroxyl groups) are macroglycols which are either polyester or polyether based. Polyurethane elastomers and resins take the form of liquid castings systems thermoplastic elastomers and resins, microcellular products, and millible gums. Typical applications are found in the automotive industry. Polyurethane foams are widely used in transportation, furniture, and construction markets.

As used herein, "polyvinyl acetate" (PVAc) refers to a thermoplastic resin produced by the polymerization of vinyl acetate monomer $[CH_3COOCHCH_2]$ in water producing an emulsion with a solids content of about 50-55%. Most polyvinyl acetate emulsions contain co-monomers such as n-butyl acrylate, 2-ethyl hexyl acrylate, ethylene, dibutyl maleate and dibutyl fumarate. Polymerization of vinyl acetate with ethylene also can be used to produce solid vinyl acetate/ethylene copolymers with more than 50% vinyl acetate content. Polyvinyl alcohol (PVOH) is produced by methanolysis or hydrolysis of polyvinyl acetates. The reaction can be controlled to produce any degree of replacement of acetate groups. Co-polymers of replaced acetate groupings and other monomers such as ethylene and acrylate esters are commercially important. Polyvinyl butyral (PVB) is made by reacting PVOH with butyraldehyde $[CH_3(CH_2)_2CHO]$. Polyvinyl formal is made by condensing formaldehyde [HCHO] in presence of PVOH or by the simultaneous hydrolysis and acetylization of PVAc. Polyvinylidene chloride is made by the polymerization of 1,1-dichloroethylene $[CH_2CCl_2]$. Typical applications for the above resins are found in adhesives, paints, coatings and finishes, and packaging.

As used herein, "polyvinyl chloride" refers to thermoplastic resins produced by the polymerization of the gas vinyl chloride $[CH_2CHCl]$. Under pressure, vinyl chloride becomes liquefied and is polymerized by one of four basic processes: suspension, emulsion, bulk, or solution polymerization. The pure polymer is hard, brittle and difficult to process, but it becomes flexible when plasticizers are added. A special class of PVC resin of fine particle size, often called dispersion grade resin, can be dispersed in liquid plasticizers to form plastisols. The addition of a volatile diluent or a solvent to the plastisol produces an organosol. Copolymers with vinyl acetate, vinylidene chloride, and maleate and fumarate esters find commercial application. Major markets for PVC are in building/construction, packaging, consumer and institutional products, and electrical/electronic uses.

As used herein, "styrene acrylonitrile" (SAN) refers to a thermoplastic copolymers of styrene $[C_6H_5CHCH_2]$ and acrylonitrile $[CH_2CHCN]$. SAN resins are random, amorphous copolymers produced by emulsion, suspension, or continuous mass polymerization. Typical uses include automobile instrument lenses and housewares.

As used herein, "styrene butadiene latexes" refer to a family of engineering thermoplastic resins characterized in that they usually have a resin content of about 50%. The styrene/butadiene ratio varies from 54:46 to 80:20. Most are carboxylated by the use of such acids as maleic [HOOCCHCHCOO], fumaric [HOOCCHCHCOOH], acrylic [CH$_2$CHCOOH], or methacrylic [CH$_2$C(CH$_3$)COOH]. Two types of styrene-maleic anhydride (SMA) [(COCH)$_2$O] are available: SMA copolymers, with and without rubber impact modifier (e.g., DYLARK) and SMA terpolymer alloys (e.g., CADON). K-Resin is a solid styrenebutadiene copolymer resin. Acrylic monomers are also used in conjunction with styrene (or styrene plus other monomers) to produce specialty resins. For example, there are transparent terpolymers of methyl methacrylate, butadiene, and styrene (MBS), and others of acrylonitrile, an acrylic monomer, and styrene (AAS). Ion-exchange resins or divinylbenzene-modified polystyrene are another variation. SB latexes are used in carpet backing and paper coatings. The other styrenics are used in paints, coatings, and floor polishes, plus many other uses.

As used herein, "sulfone polymers" refer to a family of engineering thermoplastic resins characterized by the sulfone [SO$_2$] group. Polysulfone is made by the reaction of the disodium salt of bisphenol A[(CH$_3$)$_2$C(C$_6$H$_{40}$H)$_2$] with 4,4'-dichlorodiphenyl sulfone 4,4'-DCDPS [(C$_6$H$_4$Cl)$_2$SO$_2$]. Polyethersulfone is made by the reaction of 4,4'-DCDPS with potassium hydroxide [KOH]. Polyphenylsulfone is similar to the other sulfone polymers. Typical applications for sulfone polymers are found in electrical/electronic uses and automotive parts.

As used herein, "thermoplastic polyester" refers to a family of polyesters in which the polyester backbones are saturated and hence unreactive. The most common commercial types include: PET (polyethylene terephthalate) produced by polycondensation of ethylene glycol [CH$_2$OHCH$_2$OH] with either dimethyl terephthalate (DMT) [C$_6$H$_4$(COOCH$_3$)$_2$] or terephthalic acid (TPA) [C$_6$H$_4$(COOH)$_2$]; and PBT (polybutylene terephthalate) produced by the reaction of DMT with 1,4 butanediol [HO(CH$_2$)$_4$OH]. Typical applications are found in packaging, automotive, electrical, and consumer markets.

As used herein, "unsaturated polyester" refers to thermosetting resins made by the condensation reaction between difunctional acids and glycols. The resulting polymer is then dissolved in styrene [C$_6$H$_5$CHCH$_2$] or other vinyl unsaturated monomer. The structures of the acids and glycols used and their proportions, especially the ratio of the unsaturated versus the saturated acid, and the type and amount of monomer used, are all tailored for each resin to balance economy, processing characteristics, and performance properties. One common formulation is the reaction of maleic anhydride [(COCH)$_2$O], phthalic anhydride [C$_6$H$_4$(CO)$_2$O], and propylene glycol [CH$_3$CHOHCH$_2$OH]. Both dicyclopentadiene [C$_{10}$H$_{12}$] and isophthalic acid [C$_6$H$_4$(COOH)$_2$] can be substituted for phthalic anhydride. Vinyl ester resins are linear reaction products of bisphenol A [(CH$_3$)$_2$C(C$_6$H$_{40}$H)$_2$] and epichlorohydrin [CH$_2$OCHCH$_2$Cl] that are terminated with an unsaturated acid such as methacrylic acid [CH$_2$C(CH$_3$)COOH]. Typical applications are found in transportation, appliances, electrical, and construction markets.

As used herein, "urea-formaldehyde" refers to a class of resins formed by the condensation reaction of formaldehyde [HCHO] and urea [CO(NH$_2$)$_2$]. These thermoset resins are clear water-white syrups or white powered materials which can be dispersed in water to form colorless syrups. They cure at elevated temperatures with appropriate catalysts. Molding powders are made by adding fillers to the uncured syrups, forming a consistency suitable for compression and transfer molding. The liquid and dried resins find extensive uses in laminates and chemically resistant coatings. The molding compounds are formed into rigid electrical and decorative products.

As used herein, "hexachloroethane" refers to CAS Reg. No. [67-72-1], is an initiator in the formation of polyethylenes, and has been used in the preparation of certain catalysts. Hexachloroethane, when added to spectrographic samples, improves analysis. Hexachloroethane reduces corrosion when added to flue gas cleaning systems and oil when used as a coating on metal machinery. It increases specific gravity when added to drilling mud used in oil and gas wells. It is a main ingredient in production of some types of synthetic diamonds. Other uses of hexachloroethane in the U.S. have included: a plasticizer for cellulose esters; an accelerator in rubber; a retardant in fermentation processes; a moth repellent; a component of submarine paints; a constituent of various fungicidal and insecticidal formulations; and a softening agent in hair setting and styling agents. With the possible exception of use for smoke generation, only limited quantities of hexachloroethane are used in these applications.

As used herein, a "blowing agent" or "foaming agent" refers to a substance which, when heated, decomposes to form a gas. See, e.g., *Concise Chemical and Technical Dictionary*, Fourth Enlarged Edition, Bennet, Chemical Publishing Co., NY, N.Y. (1986). The Foaming agent will decompose at elevated temperatures to form one or more gasses. Foaming agents can be used to expand the compositions into a foam. In general, the foaming agent will have a decomposition temperature (with the resulting liberation of gaseous material) from about 130° C. to about 350° C. The blowing agent can be a liquid, gas, or solid at standard temperature and pressure. Foaming agents are included in the mixture to produce foamed articles. Foaming agents are medium expanding compositions that are gases at temperatures and pressures encountered during the foam expanding step. Typically, a foaming agent is introduced in the gaseous or liquid state and expands, for example, upon a rapid decrease in pressure.

Suitable classes of blowing agents include, e.g., (C$_1$-C$_{12}$) hydrocarbons, (C$_1$-C$_{12}$)organohalogens, (C$_1$-C$_{12}$)alcohols, (C$_1$-C$_{12}$)ethers, (C$_1$-C$_{12}$)esters, (C$_1$-C$_{12}$)amines, or combinations thereof. Suitable (C$_1$-C$_{12}$)hydrocarbons include, e.g., acetylene, propane, propene, butane, butene, butadiene, isobutane, isobutylene, cyclobutane, cyclopropane, ethane, methane, ethene, pentane, pentene, cyclopentane, pentene, pentadiene, hexane, cyclohexane, hexene, hexadiene, and combinations thereof.

Other suitable specific blowing agents include, e.g., sodium bicarbonate, ammonia, nitrogen, carbon dioxide, neon, helium, butane, isobutane, 1,1-difluoroethane, p,p'-oxybis(benzene)sulfonyl hydrazide, p-toluene sulfonyl hydrazide, p-toluene sulfonyl semicarbazide, 5-phenyltetrazole, ethyl-5-phenyltetrazole, dinitroso pentamethylenetetramine, acetone, azodicarbonamide (AC), dinitroso pentamethylene tetramine (DNPT), and combinations thereof.

Additional suitable foaming agents include, e.g., Formacel® Z-2, Porofor®, Genitron®, Ficel®, Planagen®, HFC-245fa, Meforex® 134a, Meforex® 134b, HFC-365mfc, azodicarbonamide, acetone, Dinitrosopentamethylene tetramine, Exxsol® 1200, Exxsol® 1550, Exxsol® 1600, Exxsol® 2000, Exxsol® HP 95, Freon® R-22 (HCFC), R-11 (CFC), R-12 (CFC), R-113 (CFC), R-141 (HCFC), R-22 (HCFC), R-HFC134a, and HFC-134a. Additional suitable foaming agents include, e.g., SUVA® (DuPont), Dymel® (DuPont), Formacel® (DuPont), Zyron® (DuPont), Porofor® (Bayer), Genitron® (Bayer), Ficelg (Bayer), Planagen® (Bayer), Meforex® 134a (Ausimont), Meforex® 141b(Ausimont), HFC-245fa (Ausimont), HFC-365mfc (Ausimont), acetone, Exxsol® 1200 (Exxon Mobil), Exxsol® 1550 (Exxon Mobil), Exxsol® 1600 (Exxon Mobil), Exxsol® 2000 (Exxon Mobil), Exxsol® HP 95 (Exxon Mobil), Freon® R-22 (HCFC) (Foam-Tech), Freon® R-11 (CFC) (Foam-Tech), and HFC-Freon® 134a (Foam-Tech). Specifically, the blowing agent can be azodicarbonamide (AC), which is chemically designated as $H_2NC(=O)N=NC(=O)NH_2$.

As used herein, a "polymeric adhesion modifier" or "bonding polymer" refers to a material to help bond together polymers used in toughened, filled, and blended compounds.

Suitable classes of polymeric adhesion modifiers include, e.g., anhydride grafted polyolefin resins, styrene maleic anhydride (SMA) copolymers, and combinations thereof. Specifically, the anhydride can be maleic anhydride. Specifically, the polyolefin can be polyethylene, polypropylene, EPDM, ethylene vinyl acetate (EVA), a copolymer thereof, or a combination thereof.

As used herein, a "free radical source" refers to cross-linking with a peroxide. "Peroxide" refers to an organic compound that includes one or more peroxide, i.e., 0-0, linkages. Suitable peroxides are disclosed, e.g., in *Aldrich Catalogue of Fine Chemicals*(Milwaukee, Wis.). Heating the peroxide causes it to generate radicals which react with the components of the mixture to cause covalent cross-links in the mixture. By regulating the amounts and types of organic peroxide present in the mixture, the relative rates of radical generation, abstraction, and cross-linking steps can be controlled to permit foaming of the polymeric adhesion materials. The resulting materials have high cross-link levels. Peroxide cross-linking is described, e.g., in Park, *Handbook of Polymeric Foam and Foam Technology*, Polyolefin Foam, Ch. 9, pp. 186-242.

The cross-linking agent (i.e., graft initiator) can be a radical generating species, for example, a peroxide. Examples of peroxides include methylethylketone peroxide; dicumyl peroxide; 2,5-dimethyl-2,5-di(t-butylperoxy)hexane; 1,1-bis(t-butylperoxy)-3,3,5-trimethylcyclohexane; 1,1-di-(t-butylperoxy)cyclohexane; 2,2'-bis(t-butylperoxy) diisopropylbenzene; 4,4'-bis(t-butylperoxy)butylvalerate; Ethyl 3,3-bis(t-butylperoxy) butyrate; t-butyl cumyl peroxide; di [(t-butylperoxy)-isopropyl] benzene; t-butyl peroxide; 6,6,9,9-tetramethyl-3-methyl-3, n-butyl-1,2,4,5-tetraoxycyclononane; 6,6,9,9-tetramethyl-3-methyl-3-ethyl arbonylmethyl 1,2,4,5-tetraoxy-cyclononane; ethyl 3,3-di (t-butylperoxy)-butyrate; dibenzoyl peroxide; 2,4-dichlorobenzoyl peroxide; 00-t-butyl 0-(2-ethylhexyl) mono peroxycarbonate; t-butyl cumyl peroxide; 2,5-dimethyl-2,5-di-(t-butylperoxy)hexyne-3; and combinations thereof. Specifically, the graft initiator can be dicumyl peroxide, such as 40% active dicumyl peroxide (e.g., Luperco® 500 40KE).

As used herein, a "decomposition accelerating agent" refers to a chemical or combination of chemicals that accelerates decomposition and free radical generation of the free radical source.

Suitable classes of decomposition accelerating agent include inorganic salts, lead-containing compounds, metallic soaps, urea compounds, and $R^1COOR^2$, wherein: $R^1$ is $(C_1-C_{20})$alkyl, $(C_2-C_{20})$alkenyl, $(C_1-C_{20})$alkynyl, aryl$(C_1-C_{20})$ alkyl, aryl $(C_2-C_{20})$alkenyl, aryl$(C_2-C_{20})$alkynyl, cycloalkyl $(C_1-C_{20})$alkyl, cycloalkyl$(C_2-C_{20})$alkenyl, or cycloalkyl$(C_2-C_{20})$alkynyl; and $R^2$ is hydrogen, $(C_1-C_{20})$alkyl, $(C_2-C_{20})$ alkenyl, $(C_1-C_{20})$alkynyl, aryl$(C_1-C_{20})$alkyl, aryl $(C_2-C_{20})$ alkenyl, aryl$(C_2-C_{20})$alkynyl, cycloalkyl$(C_1-C_{20})$alkyl, cycloalkyl$(C_2-C_{20})$alkenyl, or cycloalkyl$(C_2-C_{20})$alkynyl; wherein any alkyl, alkenyl, alkynyl, cycloalkyl, or aryl is optionally substituted on carbon with one or more halo, nitro, cyano, $(C_1-C_{20})$alkoxy, or trifluoromethyl; or pharmaceutically acceptable salts thereof.

Specifically, the decomposition accelerating agent can be an inorganic salt. Alternatively, the decomposition accelerating agent can be a carboxylic acid. Alternatively, the decomposition accelerating agent can be a combination of an inorganic salt and a carboxylic acid. Specifically, the decomposition accelerating agent can be zinc oxide, tribasic lead sulfate, zinc stearate, lead stearate, CELLPASTE-K5, stearic acid, or a combination thereof. Specifically, the decomposition accelerating agent can be zinc oxide and stearic acid.

As used herein, an "inorganic salt" refers to a compound, that does not include any carbon atoms, that is the product resulting from the reaction of an acid and a base, e.g., sodium chloride. Any suitable inorganic salt can be employed and are disclosed, e.g., in *Aldrich Catalogue of Fine Chemicals* (Milwaukee, Wis.).

As used herein, a "carboxylic acid" refers to a compound that includes one or more $C(=O)OH$ functional groups. Any suitable carboxylic acid can be employed and are disclosed, e.g., in *Aldrich Catalogue of Fine Chemicals* (Milwaukee, Wis.).

As used herein, a "cross-linking agent" refers to a compound that increases the ability of one or more branched or straight-chained molecules to form one or more valence bridges between them. See, e.g., *Concise Chemical and Technical Dictionary*, Fourth Enlarged Edition, Bennet, Chemical Publishing Co., NY, N.Y. (1986). Cross-linking of a polymeric mixture can aid in the formation of desirable foamed and non-foamed materials. Cross-linking can also lead to improvements of the ultimate physical properties of the materials (e.g., foam cushion), such as flexibility and low tackiness. Cross-linking can take place prior to, during, or after expansion of the foam.

A class of suitable cross-linking agents include, e.g., alkoxy silanes (e.g., methyltrimethoxy silane, dimethyldimethoxy silane, phenyltrimethoxy silane, diphenyldimethoxy silane, methyltriethoxy silane, dimethyl diethoxy silane, phenyl triethoxy silane, or diphenyl diethoxy silane), oximesilanes (e.g., methyltris (methylethylketoxime) silane, dimethylbis (methylethylketoxime) silane, phenyltris (methylethylketoxime) silane, or diphenylbis (methylethylketoxime) silane). These cross-linking agents can be used individually or in a mixture of two or more.

Another suitable class of cross-linking agents includes, e.g., $(C_3-C_{10})$alkylene diols and $(C_3-C_{10})$cycloalkylene diols. Examples of $(C_3-C_{10})$alkylene diols are 1,3-propanediol, 1,4-butanediol, 1,6-hexanediol, 2-ethyl-1,3-hexanediol, 2,2,4-trimethyl-1,3-pentanediol and 2-butyl-2-ethyl-1,3-propanediol.

Additional suitable cross-linking agents includes, e.g., hydroquinone di(beta-hydroxylethyl)ether, ethoxylated bisphenol A, 4,4'-methylene bis(2-chloroaniline), 4,4'-methylenebis(3-chloro-2,6-diethylaniline), 3,5-dimethylthio-2,4-toluenediamine, 3,5-dimethylthio-2,6-toluenediamine, trimethylene glycol di-p-aminobenzoate and 1,4-bis(beta-hydroxyethoxy) benzene.

Additional suitable specific cross-linking agents include, e.g., ethyleneglycol di(meth)acrylate; diethyleneglycol di(meth)acrylate; triallyl cyanurate (TAC); triallyl isocyanurate (TAIC), triallyl phosphate (TAPA), trimethylol propane trimethacrylate; allyl methacrylate; or a combination thereof.

Suitable specific oximesilanes include, e.g., methyltris (methylethylketoxime) silane, dimethylbis (methylethylketoxime) silane, phenyltris (methylethylketoxime) silane, vinyltris (methylethylketoxime) silane, diphenylbis (methylethylketoxime) silane, and combinations thereof.

Additional additives present in the plastic waste include any one or more of a cure retarder, a reinforcing agent, a filler, an extender, a placticizer, a vulcanization agent, an antioxidant, a fire retardant, a colorant, an electrically conductive material, and a stabilizer As used herein, a "cure retarder" refers to a substance that slows the process for a polymer or polymeric-containing substance to cure. Curing refers to the time necessary for a polymeric substance to complete reaction so that it becomes infusible and chemically inert. Cure refers to the change in physical properties of a material by chemical reaction, which may be condensation, polymerization, or vulcanization; usually accomplished by the action of heat and catalysts; alone or in combination, with or without pressure. See, e.g., *Concise Chemical and Technical Dictionary*, Fourth Enlarged Edition, Bennet, Chemical Publishing Co., NY, N.Y. (1986). Retarders are chemicals that prevent the premature vulcanization of rubber compounds during mixing, caldering, and other processing steps. In the absence of the processing safety provided by retarders, scorched stocks, and consequently, waste results either during the processing steps or during the storage of the fully compounded green stocks. Retarders are often called antiscorching agents, scorch inhibitors, cure retarders, or prevulcanization inhibitors, whereas such conventional retarders as salicyclic acid, phthalic anhydride, and N-nitrosodiphenylamine (NDPA) are simply called retarders.

Conventional cure retarders include benzoic acid, phthalic anhydride, and NDPA. More recent ones include a sulfonamide derivative Vulkalent® E (Mobay) and N-(cyclohexylthio)phthalimide (CTP), Santogard® PVI and AK-8169 (Monsanto).

As used herein, a "reinforcing agent" refers to a substance that imparts strength, toughness, and a greater resistance to wear. See, e.g., *Concise Chemical and Technical Dictionary*, Fourth Enlarged Edition, Bennet, Chemical Publishing Co., NY, N.Y. (1986).

As used herein, a "filler" refers to a substance that tends to convert rubber or a polymeric material from an elastic to a ridged state, even at low concentrations, and substantially increases resistance to abrasion and tear. See, e.g., *Concise Chemical and Technical Dictionary*, Fourth Enlarged Edition, Bennet, Chemical Publishing Co., NY, N.Y. (1986).

As used herein, an "extender" refers to an inert substance that used to provide added weight of bulk and lower costs. See, e.g., *Concise Chemical and Technical Dictionary*, Fourth Enlarged Edition, Bennet, Chemical Publishing Co., NY, N.Y. (1986).

As used herein, a "plasticizer" refers to a substance which is added to a plastic or polymeric material to soften, increase toughness, or otherwise modify the properties of the plastic or polymeric material. See, e.g., *Concise Chemical and Technical Dictionary*, Fourth Enlarged Edition, Bennet, Chemical Publishing Co., NY, N.Y. (1986).

As used herein, a "vulcanization agent" refers to a substance that aids or assist in the vulcanization process. Vulcanization refers to an irreversible process during which a rubber compound, through a change in its chemical structure (e.g., cross-linking) becomes less plastic and more resistant to swelling by organic liquids, and elastic properties are conferred, improved, or extended over a greater range of temperature. See, e.g., *Concise Chemical and Technical Dictionary*, Fourth Enlarged Edition, Bennet, Chemical Publishing Co., NY, N.Y. (1986).

As used herein, an "antioxidant" refers to a substance that prevents or slows down oxidation, e.g., phenyl naphthylamine. See, e.g., *Concise Chemical and Technical Dictionary*, Fourth Enlarged Edition, Bennet, Chemical Publishing Co., NY, N.Y. (1986).

As used herein, a "fire retarder" or "fire retardant" refers to a substance that retards fire, prevents or diminishes the ability of a substance from igniting, catching fire, and/or burning.

Suitable fire retardants are disclosed, e.g., in *Flame Retardants-Products Information*, Spartan Flame Retardants, Inc., 1983, pp. 1-17; *Flame retardants Buyers Guide*, American Dyestuff Reporter, January 1996, pp. 15-31; *Flame Retardants-101: Basic Dynamics-Past Efforts Create Future Opportunities*, Fire Retardant Chemicals Association, Mar. 24-27, 1996, pp. 1-220; *Phosphorous-Containing Polymers*, Enc. of Polymer Science and Engineering, vol. 11, 1998, pp. 96-111; *Phosphorous Flame Retardants*, Enc. of Chemical Tech., vol. 10, 1993, pp. 976-993; *Flame Retardants: Cool Under Fire*, Chemical Engineering, September 1995, vol. 102, No. 9, pp. 65-68; Fine Chemical, Vol. 20, No. 11 (1991) pp.9-36; Kirk-Othmer, "Phosporous Flame retardants", *Encyclopedia of Chemical Technology*, vol. 10, 1993, pp. 976-993; *Kirk-Othmer Encyclopedia of Chemical Technology*, 4th ed., vol. 25, John Wiley & Sons, New York, 1998, pp. 627-664; Fire Retardant Chemical Association (FRCA) (http://www.arcat.com); International Resources (Columbus, Md.); *Handbook of Flame Retardant Chemicals and Fire Testing Services*, Russell C. Kidder, Technomic Publ. (1994); *Fire Hazard Comparison of Fire-Retarded and Non-Fire-Retarded Products*: Results of a Test Program Conducted by the Center for Fire Research for the Fire Retardant Chemicals Association, Publishing Company Technomic (Editor), Paperback-January 1988; *Fire Retarded Polymer Applications*, Kidder, Hardcover, January 1997; and *Fire Safety through Use of Flame Retarded Polymers*: Papers-Joint Meeting SPE and Fire Retardant Chemicals Association, Adam's Mark Hotel, Houston, Tex., March 25-27, 1985;Society of Plastics Engineers Staff, Paperback/Books on Demand.

Suitable specific fire retardants include, e.g., phosphonium ammonium borate (i.e., phospho-ammonium boron); 3,4,5,6-dibemzo-1,2-oxaphosphane-2-oxide or 9,10-dihydro-9-oxa-10-phospaphenanthrene-10-oxide (OPC) [CAS Registry Number 35948-25-5]; sulfamic acid monoammonium salt (ammonium sulfamate) [CAS Registry Number 7773-06-0]; di-n-butyltin oxide (DBTO) [CAS Registry Number 818-08-6]; di-n-octyltin oxide (DOTO) [CAS Registry Number 780-08-6]; dibutyltin diacetate di-n-butyltin diacetate (NS-8) [CAS Registry Number 1067-33-0]; dibutyltin dilaurate di-n-butyltin dilaurate (Stann BL) [CAS Registry Number 77-58-7]; ferrocene; iron pentacarbonyl; ammonium sulfate; ammonium phosphate; zinc chloride; and combinations thereof.

As used herein, a "stabilizer" refers to a substance that when added to a plastic or polymeric material, will prevent or slow down the aging and weathering changes. See, e.g., *Concise Chemical and Technical Dictionary*, Fourth Enlarged Edition, Bennet, Chemical Publishing Co., NY, N.Y. (1986).

As used herein, an "electrically conductive material" or "electrical conductive material" refers to any substance that increases the electrical conductivity of the article of manufacture (e.g., foam cushion). Suitable electrically conductive materials include, e.g., metal containing substances.

Figure 1:
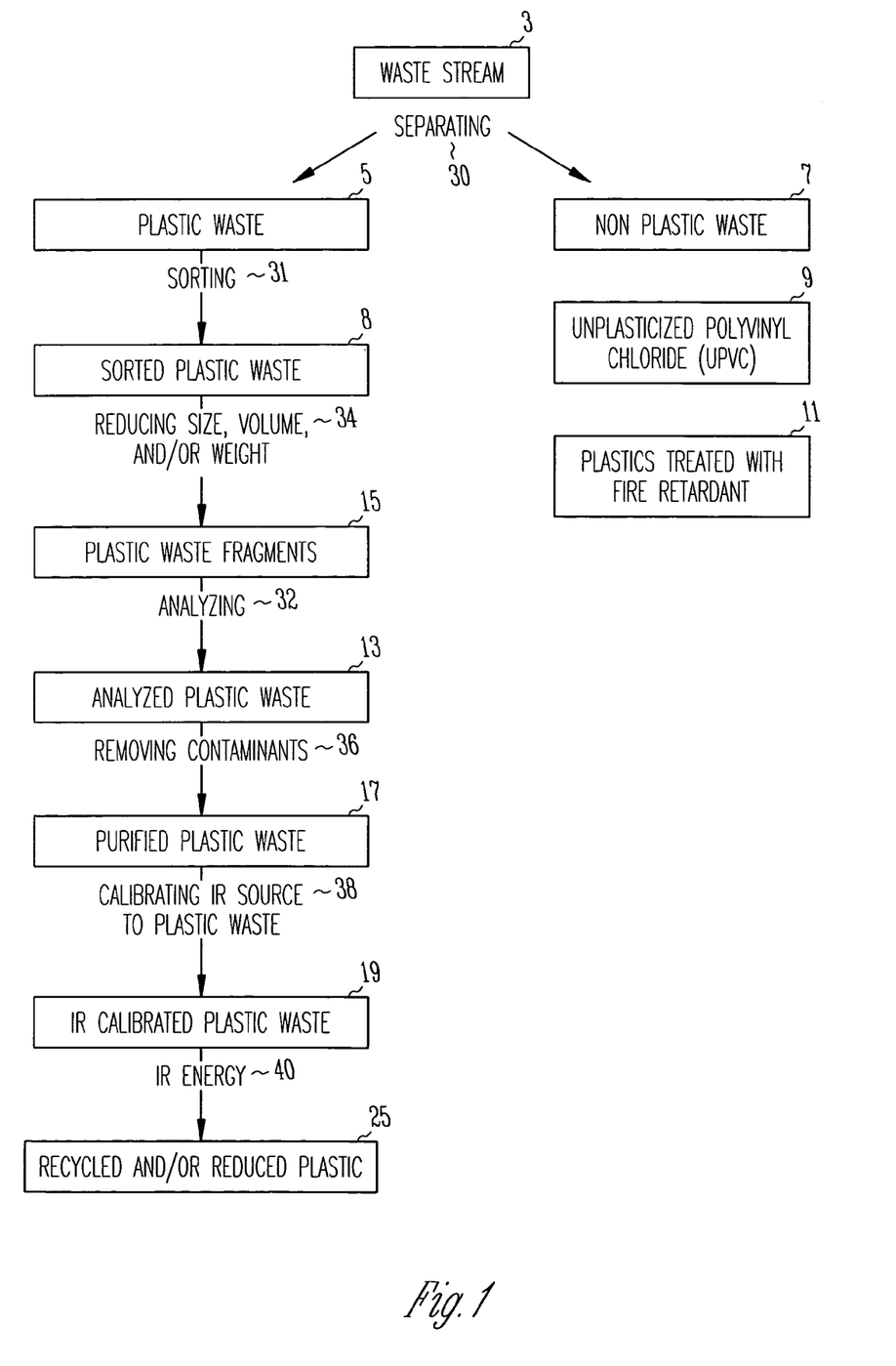
FIG. 1 illustrates a block flow diagram depicting methods of the present invention.
Figure 2:
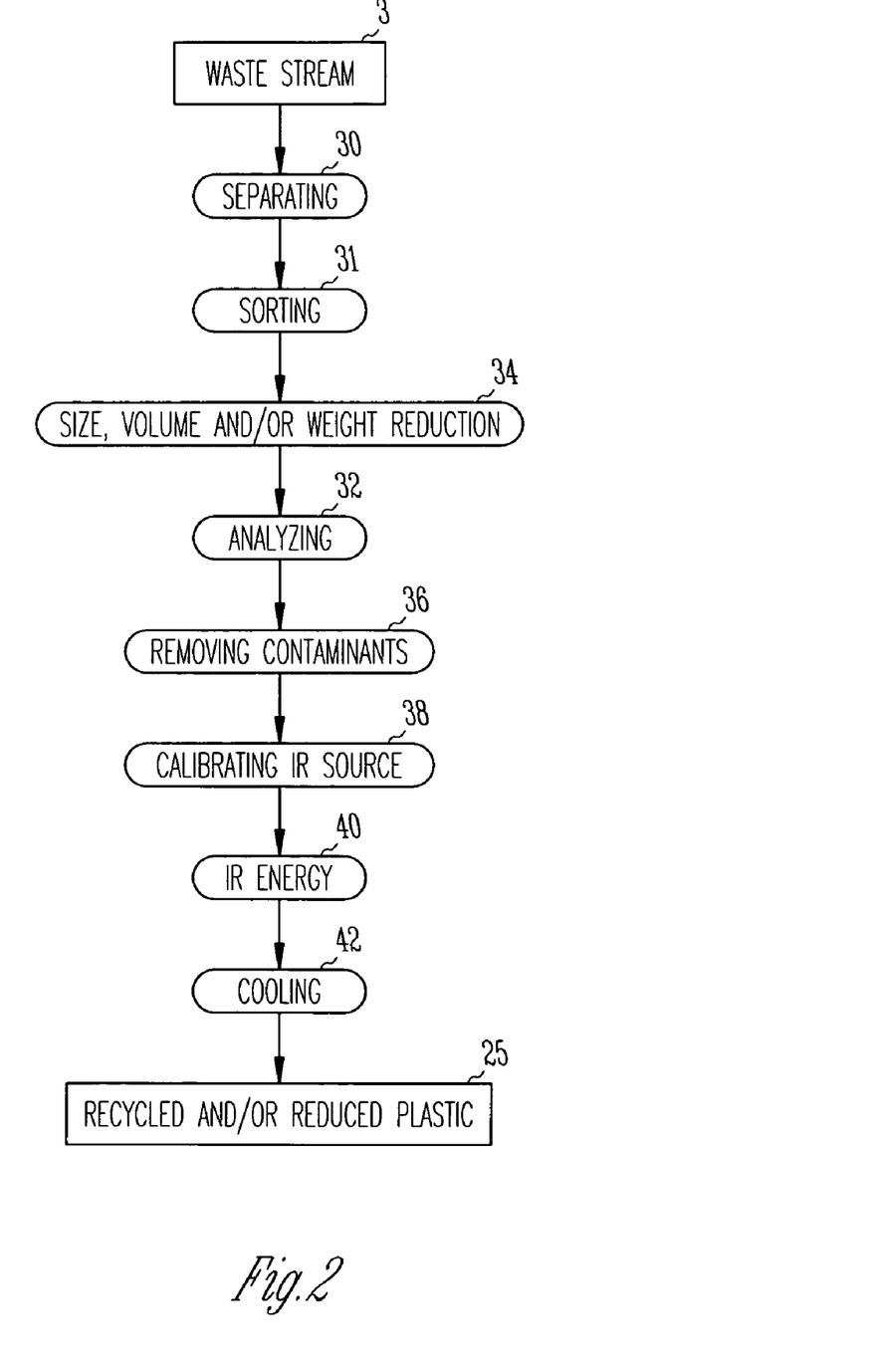
FIG. 2 illustrates a block flow diagram depicting methods of the present invention.

Referring to FIGS. 1-2, novel methods of the present invention are provided. The methods include exposing plastic to infrared (IR) energy 40. The plastic that is exposed to the infrared (IR) energy 40 can be present in the waste stream 3, the plastic waste 5, the analyzed plastic waste 13, the plastic waste fragments 15, the purified plastic waste 17, the IR calibrated plastic waste 19, or any combination thereof. As such, prior to exposure to the infrared (IR) energy 40, the plastic present in the waste stream 3 can optionally be separated 30, analyzed 32, reduced in size, weight and/or volume 34, have the contaminants located therein removed 36, have an IR source calibrated to the plastic 38, or any combination thereof. The plastic is exposed to the infrared (IR) energy 40 at one or more frequencies and at one or more intensities, over a period of time effective to heat the plastic present in the plastic waste. Sufficient exposure of the plastic to the infrared (IR) energy 40 will provide recycled plastic, reduced plastic, or a combination thereof 25. Subsequent to the exposure of the plastic to the infrared (IR) energy 40, the recycled plastic and/or reduced plastic 25, can optionally be cooled 42.

Separating the Waste Stream

In some embodiments of the invention, the waste stream 3 can be separated 30, such that at least some of the non-plastic waste 7 is removed from the waste stream 3. Additionally, the waste stream 3 can be separated 30, such that at least some of the unplasticized polyvinyl chloride (UPVC) 9, plastic treated with fire retardant 11, or a combination thereof, is removed from the waste stream 3. Each of the separated non-plastic waste 7, unplasticized polyvinyl chloride (UPVC) 9, and plastic treated with fire retardant 11 can be discarded or can be employed for other purposes (e.g., recycled employing other methods). In one embodiment, the waste stream 3 can be separated 1, as described above, by visually inspecting the waste stream 3. In another embodiment, the waste stream 3 can be separated 1, as described above, employing other means known to those of skill in the art.

Specifically, at least about 10 wt. % of the non-plastic waste 7 can be removed from the waste stream 3. More specifically, at least about 50 wt. % of the non-plastic waste 7 can be removed from the waste stream 3. More specifically, at least about 75 wt. % of the non-plastic waste 7 can be removed from the waste stream 3. More specifically, up to about 100 wt. % of the non-plastic waste 7 can be removed from the waste stream 3.

Specifically, at least about 10 wt. % of the unplasticized polyvinyl chloride (UPVC) 9 can be removed from the waste stream 3. More specifically, at least about 50 wt. % of the unplasticized polyvinyl chloride (UPVC) 9 can be removed from the waste stream 3. More specifically, at least about 75 wt. % of the unplasticized polyvinyl chloride (UPVC) 9 can be removed from the waste stream 3. More specifically, up to about 100 wt. % of the unplasticized polyvinyl chloride (UPVC) 9 can be removed from the waste stream 3.

Specifically, at least about 10 wt. % of the plastic treated with fire retardant 11 can be removed from the waste stream 3. More specifically, at least about 50 wt. % of the plastic treated with fire retardant 11 can be removed from the waste stream 3. More specifically, at least about 75 wt. % of the plastic treated with fire retardant 11 can be removed from the waste stream 3. More specifically, up to about 100 wt. % of the plastic treated with fire retardant 11 can be removed from the waste stream 3.

After the waste stream 3 has been separated 30, to remove non-plastic waste 7, unplasticized polyvinyl chloride (UPVC) 9, and/or plastic treated with fire retardant 11 from the waste stream 3; the plastic waste 5 can be sorted 31 to provide sorted plastic waste 8. The plastic waste 5 can be sorted 31, to provide sorted plastic waste 8, based on physical parameters such as size, weight, volume, density, or a combination thereof. For example, the plastic waste 5 can be sorted 31, to provide relatively dense sorted plastic waste 8 and relatively non dense sorted plastic waste 8. Alternatively, the plastic waste 5 can be sorted 31, to provide relatively large sorted plastic waste 8 and relatively small sorted plastic waste 8.

Reducing the Size, Volume an/or Weight of Plastic

In some embodiments of the invention, the plastic (e.g., plastic located in the waste stream 3, plastic waste 5, sorted plastic waste 8, or a combination thereof) can optionally be reduced in size, volume and/or weight 34, to provide plastic weight fragments 15. Some materials respond better to exposure to infrared (IR) energy with little or no mechanical reduction in size. Other materials, however, respond better to exposure to infrared (IR) energy with a mechanical reduction in size. For example, household waste typically respond better to exposure to infrared energy with a mechanical reduction in size.

Specifically, the plastic can be reduced in size 34 by shredding, cutting, slicing, ripping, shaving, tearing, slashing, carving, cleaving, cutting, dissevering, hacking, incising, severing, shearing, fragmenting, fraying, lacerating, and/or grinding, the plastic. Specifically, the plastic can be reduced in size 34, such that the size of plastic waste fragments 15 are less than about 50% of size of the pieces of the plastic located in the waste stream 3, the plastic waste 5, or the combination thereof. More specifically, plastic located in the waste stream 3, the plastic waste 5, or the combination thereof can be reduced in size 34, such that the size of the plastic waste fragments 15 are less than about 25% of the size of the pieces of the plastic located in the waste stream 3, the plastic waste 5, or the combination thereof. More specifically, the plastic in the waste stream 3, the plastic waste 5, or a combination thereof can be reduced in size 34, such that the size of the plastic waste fragments 15 are less than about 10% of the size of the pieces of the plastic located in the waste stream 3, the plastic waste 5, or the combination thereof.

Specifically, the plastic in the waste stream 3, the plastic waste 5, or the combination thereof can be reduced in weight 34 by shredding, cutting, slicing, ripping, shaving, tearing, slashing, carving, cleaving, cutting, dissevering, hacking, incising, severing, shearing, fragmenting, fraying, lacerating, and/or grinding, the plastic located in the waste stream 3, the plastic waste 5, or the combination thereof. Specifically, the plastic in the waste stream 3, the plastic waste 5, or a combination thereof can be reduced in weight 34, such that the weight of the plastic waste fragments 15 are less than about 50% of the weight of the pieces of the plastic located in the waste stream 3, the plastic waste 5, or the combination thereof. More specifically, the plastic in the waste stream 3, the plastic waste 5, or the combination thereof can be reduced in weight 34, such that the weight of the plastic waste fragments 15 are less than about 25% of the weight of the pieces of the plastic located in the waste stream 3, the plastic waste 5, or the combination thereof. More specifically, the plastic in the waste stream 3, the plastic waste 5, or a combination thereof can be reduced in weight 34, such that the weight of the plastic waste fragments 15 are less than about 10% of the weight of the pieces of the plastic located in the waste stream 3, the plastic waste 5, or the combination thereof.

Specifically, the plastic in the waste stream 3, the plastic waste 5, or the combination thereof can be reduced in volume 34 by shredding, cutting, slicing, ripping, shaving, tearing, slashing, carving, cleaving, cutting, dissevering, hacking, incising, severing, shearing, fragmenting, fraying, lacerating, and/or grinding, the plastic located in the waste stream 3, the plastic waste 5, or the combination thereof. Specifically, the plastic in the waste stream 3, the plastic waste 5, or a combination thereof can be reduced in volume 34, such that the volume of the plastic waste fragments 15 are less than about 50% of the volume of the pieces of the plastic located in the waste stream 3, the plastic waste 5, or the combination thereof. More specifically, the plastic in the waste stream 3, the plastic waste 5, or the combination thereof can be reduced in volume 34, such that the volume of the plastic waste fragments 15 are less than about 25% of the volume of the pieces of the plastic located in the waste stream 3, the plastic waste 5, or the combination thereof. More specifically, the plastic in the waste stream 3, the plastic waste 5, or a combination thereof can be reduced in volume 34, such that the volume of the plastic waste fragments 15 are less than about 10% of the volume of the pieces of the plastic located in the waste stream 3, the plastic waste 5, or the combination thereof.

Analyzing Plastics Waste

In some embodiments of the invention, the plastic (e.g., the plastic located in the waste stream 3, the plastic waste 5, sorted plastic waste 8, the plastic waste fragments 15, the purified plastic waste 17, or any combination thereof) can optionally be analyzed by various methods or apparatus to determine characteristics of the plastic. Chemical composition, weight, density, volume, and/or mass are desirably known before the plastic is heated or otherwise processed, so that processing parameters specific to the type and quantity of plastic can be determined.

As an example, spectroscopy techniques can be used to determine the type or types of plastic located therein. Infrared light, or light from another spectrum, is projected through the plastic, to a photosensitive detector or group of detectors that are able to sense the relative intensities of at least two different frequencies of light. Because various materials absorb light of different frequencies in different ratios, the chemical compositions of many materials can be determined by projecting light of various frequencies through the material and determining the light absorption in the material at various frequencies via photodetectors.

Broad light spectrum analysis using many different frequencies is commonly used in laboratory instruments where the nature of a material is entirely unknown, or where at least some component of the material is unknown. In other applications where the material is believed likely to be one of a modest list of compounds, the compound can often be approximately determined by use of relatively few light frequencies, or by use of a relatively narrow spectrum of light. Some embodiments of the present invention will therefore use a narrow range of light, such as an infrared light source with two to ten discrete wavelength sensors, to determine the relative absorption spectra of the plastic located therein, and estimate its composition.

Although certain measurements, such as weight and spectral absorption are explicitly discussed here as examples, other measurements will be performed in further embodiments, as will variations on the analysis examples given here.

Removing Contaminants

In some embodiments of the invention, the plastic waste (e.g., the plastic located in the waste stream 3, plastic waste 5, sorted plastic waste 8, plastic waste fragments 15, the analyzed plastic waste 13, or any combination thereof) can optionally have at least some of the contaminants located therein separated or removed 36, to provide a purified plastic waste 17. The contaminants that are removed can be discarded or employed for other purposes.

In one embodiment, the contaminants can be separated or removed 36 by exposing the plastic waste to a magnetic field, to effectively remove at least a portion of the metal contaminants located therein. For those metal contaminants that are not magnetically charged, such metal contaminants can be removed via centripetal or centrifugal forces. Such metal contaminants will typically have densities that vary significantly from the densities of the other components typically present in the waste stream 3, plastic waste 5, plastic waste fragments 15, the analyzed plastic waste 13, or any combination thereof.

In another embodiment, at least some of the contaminants located in the plastic waste can be separated or removed 36, by washing, rinsing or spraying with a composition that includes water. Such a composition can optionally include at least one of a detergent, a surfactant, a de-surfactant, a cationic agent, an anionic agent and a non-ionic agent. By contacting the plastic waste with the composition, at least a portion of the contaminants can be removed 36.

Specifically, the contaminant can include household contaminants, agricultural contaminants, and/or industrial contaminants. More specifically, the contaminant can include food residue, drink residue, paper, animal soiling, human soiling, blood tissue, effluence, waste vegetable contamination, cleaning fluids, household chemicals, silage, grass, general vegetation residue, animal slurry, fertilizer, chemicals, crossed link polymers, lubricants, foaming agents, blowing agents, organics, inorganics, surfactants, polymeric adhesion modifiers, bonding polymers, free radical sources, cross-linking agents, decomposition accelerating agents, cure retarders, reinforcing agents, fillers, extenders, placticizers, vulcanization agents, antioxidants, fire retardants, colorants, electrically conductive materials, and/or stabilizers.

As stated above, at least some of the contaminants located therein can be removed 36. Specifically, at least about 10 wt. % of the contaminants located therein can be removed 36. More specifically, at least about 50 wt. % of the contaminants located therein can be removed 36. More specifically, at least about 75 wt. % of the contaminants located therein can be removed 36. More specifically, up to about 100 wt. % of the contaminants located therein can be removed 36.

Calibrating Infrared (IR) Source to Plastic

Infrared light is substantially absorbed in most plastics, and causes heating of the plastic. As previously discussed, heating a plastic will typically allow it to be re-formed, reduced, or otherwise altered in chemical structure or physical configuration. The present invention seeks in various embodiments to apply infrared light to plastic as a way of transferring energy to the plastic as thermal energy such that it reaches a heat or temperature at which point this re-forming or other desired change in the plastic takes place.

Application of infrared is in some embodiments determined as a result of analysis of the plastic (e.g., the plastic located in the waste stream 3, the plastic waste 5, the plastic waste fragments 15, sorted plastic waste 8, the purified plastic waste 17, or any combination thereof). Using the analysis examples given above, if a weight and composition of a sample of waste plastic are determined, the specific heat and mass of the plastic will be known and the amount of energy needed to increase the plastic's temperature a desired amount can be estimated. This is either calculated, or determined by means such as a lookup table in different embodiments of the invention.

Measurement of the energy imparted to the plastic is further used in some embodiments to calibrate the infrared exposure. Various technologies, such as infrared optical sensors, can be used to estimate the heat or temperature of the plastic located therein, and to provide feedback regarding the temperature, rate of heating, uniformity of heating, and other such characteristics of the plastic located therein. The exposure to infrared light energy is then varied consistent with the measurements and the desired temperature.

Infrared light exposure is employed in multiple ways in different embodiments. A change in light intensity, light spectrum, or length of exposure can achieve the desired effect of changing the energy imparted to a sample of plastic. Because various plastics absorb infrared light of different frequencies in different amounts, some embodiments of the invention will utilize multiple infrared light sources, or will filter the infrared sources depending on the type of plastic being heated. Other embodiments will vary the parameters associated with a single-spectrum infrared light source to control thermal energy transfer to the plastic.

Analysis of the plastic will not necessarily allow determination of an exact time, light intensity, or other parameter used to heat the waste material. For example, if the infrared light intensity is doubled in a specific system, the exposure time can likely be roughly halved and result in the same energy transfer. Various other considerations, such as speed and efficiency of heating, and desired uniformity of heating will therefore also play a part in selection of the infrared heating parameters.

Applying IR Energy

Application of infrared light to impart thermal energy into the plastic (e.g., the plastic located in the waste stream 3, plastic waste 5, sorted plastic waste 8, plastic waste fragments 15, purified plastic waste 17, analyzed plastic waste 13, IR calibrated plastic waste 19, or any combination thereof) will therefore be dependent not only on physical properties of the plastic, but on design choices of the system architect. As an example, a single infrared light source may require several minutes to evenly heat a specific sample of plastic. The same sample of plastic may be heated just as evenly by application of multiple light sources arranged in a physical configuration designed to evenly heat a sample area in a matter of seconds (e.g., up to about 2 minutes). This will desirably increase the speed and efficiency of the plastic heating assembly, but may be a significantly more expensive apparatus to build and maintain.

Because many plastics have a melting point and a combustion point that are reasonably near one another and well within an infrared heater's capability, careful design and configuration of the system will also beneficially ensure that no portion of the plastic is heated to its combustion point during the process of heating the plastic to or past its melting point. The various apparatus and methods described here, taken alone or in combination with related existing technologies such as reflectors, diffusers, lenses, and the like, will desirably seek to heat the waste material evenly as well as efficiently.

As discussed above, the plastic (e.g., the plastic located in the waste stream 3, plastic waste 5, sorted plastic waste 8, plastic waste fragments 15, purified plastic waste 17, analyzed plastic waste 13, IR calibrated plastic waste 19, or any combination thereof) can be exposed to the infrared (IR) energy 40, at one or more frequencies and at one or more intensities, over a period of time effective to heat the plastic. In one embodiment, the plastic will include one type of plastic, e.g., one of terephthalate (PET or PETE), high density polyethylene (HDPE), polyvinyl chloride (PVC), low density polyethylene (LDPE), polypropylene (PP), and polystyrene (PS). In such an embodiment, the plastic can be contacted with the infrared (IR) energy 40, at one or more frequencies and at one or more intensities, over a period of time effective to heat the plastic located therein, to a temperature above the melting point of the plastic located therein, below the combustion point of the plastic located therein, or between the melting point and combustion point of the plastic located therein.

For example, the plastic can include terephthalate (PET or PETE). In such an embodiment, the plastic can be heated to a temperature of above about 260° C., to a temperature below about 300° C., or at a temperature between about 260° C. and about 300° C.

Alternatively, the plastic can include high density polyethylene (HDPE). In such an embodiment, the plastic can be heated to a temperature of above about 240° C., to a temperature below about 280° C., or at a temperature between about 240° C. and about 280° C.

Alternatively, the plastic can include polyvinyl chloride (PVC). In such an embodiment, the plastic can be heated to a temperature of above about 170° C., to a temperature below about 230° C., or at a temperature between about 170° C. and about 230° C.

Alternatively, the plastic can include low density polyethylene (LDPE). In such an embodiment, the plastic can be heated to a temperature of above about 180° C., to a temperature below about 240° C., or at a temperature between about 180° C. and about 240° C.

Alternatively, the plastic can include polypropylene (PP). In such an embodiment, the plastic can be heated to a temperature of above about 230° C., to a temperature below about 270° C., or at a temperature between about 230° C. and about 270° C.

Alternatively, the plastic can include polystyrene (PS). In such an embodiment, the plastic can be heated to a temperature of above about 180° C., to a temperature below about 270° C., or at a temperature between about 180° C. and about 270° C.

In another embodiment, the plastic will include more than one type of plastic, e.g., two or more of terephthalate (PET or PETE), high density polyethylene (HDPE), polyvinyl chloride (PVC), low density polyethylene (LDPE), polypropylene (PP), and polystyrene (PS). In such an embodiment, the plastics-containing waste material can be contacted with the infrared (IR) energy 40, at one or more frequencies and at one or more intensities, over a period of time effective to heat the plastic to a temperature above the melting point of one of the plastics located therein, but below the combustion point of each of the plastics located therein. That plastic can selectively be removed from the waste stream 3, plastic waste 5, plastic waste fragments 15, purified plastic waste 17, analyzed plastic waste 13, IR calibrated plastic waste 19, or any combination thereof, without decomposing or combusting any of the other plastics located therein. If desired, this process can be repeated until each of the desired plastics located therein is selectively removed from the waste stream 3, plastic waste 5, plastic waste fragments 15, purified plastic waste 17, analyzed plastic waste 13, IR calibrated plastic waste 19, or any combination thereof, without substantially decomposing or combusting any of the other plastics located therein.

For example, the plastic can include each of terephthalate (PET or PETE), high density polyethylene (HDPE), polyvinyl chloride (PVC), low density polyethylene (LDPE), polypropylene (PP), and polystyrene (PS). While employing infrared (IR) energy 40, the plastic can initially be heated to a temperature between about 170° C. and about 230° C., to effectively melt and selectively remove the polyvinyl chloride (PVC). While employing infrared (IR) energy 40, the plastic can then be heated to a temperature between about 180° C. and about 230° C., to effectively melt and selectively remove the low density polyethylene (LDPE) and/or the polystyrene (PS). While employing infrared (IR) energy 40, the plastic can then be heated to a temperature between about 230° C. and about 260° C., to effectively melt and selectively remove the polypropylene (PP) and/or high density polyethylene (HDPE). While employing infrared (IR) energy 40, the plastic can then be heated to a temperature between about 260° C. and about 300° C., to effectively melt and selectively remove the terephthalate (PET or PETE).

The plastic can be contacted with the infrared (IR) energy 40 at any suitable pressure, effective to heat the plastic present in the plastic. For example, the plastic can be contacted with the infrared (IR) energy 40 at a pressure of at least about 0.9 atm., at least about 1.0 atm, at least about 2.0 atm or at least about 5.0 atm.

As stated above, the plastic can be contacted with the infrared (IR) energy 40, at one or more frequencies and at one or more intensities, over a period of time effective to heat the plastic. It is appreciated that those of skill in the art understand that each of the frequency of the IR energy 40, the intensity of the IR energy 40, and period of time of the IR energy 40 will depend not only upon the nature (e.g., types of plastic present) and amount (e.g., how much of each of the types of plastic are present) in the waste stream 3, plastic waste 5, plastic waste fragments 15, sorted plastic waste 8, purified plastic waste 17, analyzed plastic waste 13, IR calibrated plastic waste 19, or any combination thereof, but also upon the other variables, e.g., the frequency of the IR energy 40, the intensity of the IR energy 40, and/or period of time of the IR energy 40.

Reducing the Volume and/or Weight

In some embodiments of the invention, the plastic (e.g., plastic present in the waste stream 3, plastic waste 5, sorted plastic waste 8, plastic waste fragments 15, purified plastic waste 17, analyzed plastic waste 13, IR calibrated plastic waste 19, or any combination thereof) can be exposed to the infrared energy 40, thereby effectively reducing the weight. This can be accomplished by exposing the plastic to the IR energy 40, for a period of time sufficient to reduce the weight. Typically, the weight reduction will include removing at least a portion of the moisture, volatile organics, or a combination thereof, from the plastic. Specifically, the weight can be reduced, upon exposing the plastic to the IR energy 40, by dehydrating the plastic.

In some embodiments of the invention, the plastic (e.g., plastic present in the waste stream 3, plastic waste 5, plastic waste fragments 15, sorted plastic waste 8, purified plastic waste 17, analyzed plastic waste 13, IR calibrated plastic waste 19, or any combination thereof) can be exposed to the infrared energy 40, thereby effectively altering or changing (e.g., increasing or decreasing) the volume. This can be accomplished by exposing the plastic to the IR energy 40, for a period of time sufficient to alter the volume. Typically, the volume reduction will include removing at least a portion of the moisture, volatile organics, or a combination thereof, from the plastic. Specifically, the volume can be reduced, upon exposing the plastic to the IR energy 40, by dehydrating the plastic. Alternatively, the volume increase will include decomposing a substance located in the plastic, thereby releasing a gas from the plastic, effective to increase the volume. Such a substance will act or behave similar to a blowing agent.

Specifically, the volume of the plastic can be reduced by up to about 10%, by up to about 50%, by up to about 75%, or by up to about 90%. The amount of volume that can be reduced will typically depend upon the amount of moisture, volatile organics, or a combination thereof, present in the plastic.

Specifically, the weight of the plastic can be reduced by up to about 10%, by up to about 50%, by up to about 75%, or by up to about 90%. The amount of weight that can be reduced will typically depend upon the amount of moisture, volatile organics, or a combination thereof, present in the plastic.

Sterilizing

In some embodiments of the invention, the plastic (e.g., plastic present in the waste stream 3, plastic waste 5, plastic waste fragments 15, sorted plastic waste 8, purified plastic waste 17, analyzed plastic waste 13, IR calibrated plastic waste 19, or any combination thereof) can be exposed to the infrared energy 40, thereby effectively sterilizing the plastic. This can be accomplished by exposing the plastic to the IR energy 40, for a period of time sufficient to sterilize the plastic.

Chemically Inert

In some embodiments of the invention, the plastic (e.g., plastic present in the waste stream 3, plastic waste 5, plastic waste fragments 15, sorted plastic waste 8, purified plastic waste 17, analyzed plastic waste 13, IR calibrated plastic waste 19, or any combination thereof) can be exposed to the infrared energy 40, thereby effectively rendering the plastic chemically inert. This can be accomplished by exposing the plastic to the IR energy 40, for a period of time sufficient to render the plastic chemically inert.

Cooling

The recycled plastic and/or reduced plastic 25 can optionally be cooled 42. The recycled plastic and/or reduced plastic 25 can be cooled 42 by ambient (e.g., room temperature) or chilled air. Specifically, the recycled plastic and/or reduced plastic 25 can be cooled 42 employing air having a temperature of less than about 75° C. More specifically, the recycled plastic and/or reduced plastic 25 can be cooled 35 employing air having a temperature of less than about 50° C. More specifically, the heated plastic 27 can be cooled 35 employing air having a temperature of less than about 25° C. More specifically, the heated plastic 27 can be cooled 35 employing air having a temperature of less than about 10° C.

Order of Steps

As stated above, each of the separating 30, sorting 31, size, volume, and/or weight reduction 34, the analyzing 32, the contaminant removal 36, and the calibrating the IR source to the plastic 36 are each independently optional steps employed in the process of the present invention. As such, the process of the present invention can be carried out with the inclusion of any combination of the separating 30, sorting 31, size, volume, and/or weight reduction 34, the analyzing 32, the contaminant removal 36, and the calibrating the IR source to the plastic 36. More specifically, the process of the present invention can be carried out with the inclusion of any combination of the separating 30, sorting 31, size, volume, and/or weight reduction 34, the analyzing 32, the contaminant removal 36, and the calibrating the IR source to the plastic 36, in any suitable and appropriate order. For example, the methods of the present invention can include both the analyzing 32 and the contaminant removal 36. In one embodiment, the analyzing 32 can occur prior to the contaminant removal 36. In another embodiment, the analyzing 32 can occur subsequent to the contaminant removal 36.

It is appreciated that those of skill in the art understand that when employed, each of the separating 30, sorting 31, size, volume, and/or weight reduction 34, the analyzing 32, the contaminant removal 36, and the calibrating the IR source to the plastic 36 will typically be carried out prior to exposing the plastic to the IR energy 40. Likewise, it is appreciated that those of skill in the art understand that when employed, the cooling 42 will typically be carried out subsequent to exposing the plastic to the IR energy 40.

Table 1 illustrates seven specific plastics that can effectively be recycled employing methods of the present invention. Also shown in Table 1 are the corresponding melting points and combustion points of such plastics.

TABLE 1

| Material | Melt Point | Combustion Point |
|---|---|---|
| P.E.T./PETE | 260° C. | 300° C. |
| H.D.P.E. | 240° C. | 280° C. |
| P.V.C. | 170° C. | 230° C. |
| L.D.P.E. | 180° C. | 240° C. |
| E.P.P. | 230° C. | 270° C. |
| E.P.S. | 180-230° C. | 220/270° C. |
| P.U | 192-200° C. | 300° C. |

All publications, patents, and patent documents cited herein are incorporated by reference herein, as though individually incorporated by reference. The invention has been described with reference to various specific and preferred embodiments and techniques. However, it should be understood that many variations and modifications may be made while remaining within the spirit and scope of the invention.

It is appreciated that certain features of the invention, which are, for clarity, described in the context of separate embodiments, may also be provided in combination in a single embodiment. Conversely, various features of the invention which are for brevity, described in the context of a single embodiment, may also be provided separately or in any sub-combination.

The invention claimed is:

1. A method comprising:
   (a) separating a waste stream that includes plastic waste, such that at least a portion of non-plastic waste, unplasticized polyvinyl chloride (UPVC), plastics treated with a fire retardant, or a combination thereof is separated from the waste stream, thereby providing a plastic waste;
   (b) reducing the size of the plastic waste;
   (c) analyzing the plastic waste, in which analyzing includes:
   projecting an infrared light through the plastic waste to one or more detectors sufficient to provide a spectral content, the infrared light having at least two distinct frequency components;
   analyzing the spectral content of the infrared light transmitted through the plastic waste; and
   comparing the spectral content of the infrared light transmitted through the plastic waste to known spectral content profiles for two or more materials to determine which of the two or more materials comprise the plastic waste;
   (d) removing solid particles, organic matter, contaminants, metal contaminants, or a combination thereof, from the plastic waste;
   (e) calibrating an infrared (IR) source to the plastic waste, wherein the calibrating occurs after analyzing;
   (f) contacting the plastic waste with infrared (IR) energy at one or more frequencies and at one or more intensities, over a period of time effective to heat plastic present in the plastic waste;
   (g) contacting the plastic waste with infrared (IR) energy at one or more frequencies and at one or more intensities, over a period of time effective to alter the volume of the plastic waste;
   (h) contacting the plastic waste with infrared (IR) energy at one or more frequencies and at one or more intensities, over a period of time effective to reduce the weight of the plastic waste; and
   (i) cooling the heated plastic waste;
   thereby effectively providing recycled plastic, reduced plastic, or a combination thereof.

2. The method of claim 1 wherein the waste stream that includes plastic waste comprises at least about 70 wt. % plastic.

3. The method of claim 1 wherein the waste stream that includes plastic waste comprises at least about 80 wt. % plastic.

4. The method of claim 1 wherein the waste stream that includes plastic waste comprises at least about 90 wt. % plastic.

5. The method of claim 1 wherein the plastic waste comprises a thermoset plastic.

6. The method of claim 1 wherein the plastic waste comprises a thermoplastic plastic.

7. The method of claim 1 wherein the plastic waste comprises a plastic selected from the group of polyethylene terephthalate, high density polyethylene, poly vinyl chloride, low density polyethylene, polypropylene, polystyrene, or any combination thereof.

8. The method of claim 1 wherein the analyzing comprises:
   projecting an infrared light having at least two distinct spectral frequency components through free space to an infrared light detector;
   determining the spectral intensity of light received at the infrared light detector through free space;
   projecting the infrared light having at least two distinct spectral frequency components through the plastic waste;
   determining the spectral intensity of light received at the infrared light detector through the plastic waste; and
   deriving spectral absorption data for the waste material by comparing the spectral intensity of light received through free space to the spectral intensity of light received through the plastic waste.

9. The method of claim 1 wherein the reducing of the size of the plastic waste employed comprises at least one of shredding, cutting, slicing, ripping, shaving, tearing, slashing, carving, cleaving, cutting, dissevering, hacking, incising, severing, shearing, fragmenting, fraying, lacerating, and grinding, of the plastic waste.

10. The method of claim 1 wherein the calibrating comprises estimating a composition of the plastic waste and a weight of the plastic waste, and deriving an infrared exposure from the composition and weight.

11. The method of claim 10, wherein derived infrared exposure comprises determining at least one of time of exposure and intensity of infrared light.

12. The method of claim 1 wherein the infrared energy in step (f), (g), (h), or a combination thereof, is of a frequency between about 600 $cm^{-1}$ and about 6000 $cm^{-1}$.

13. The method of claim 1 wherein the intensity in step (f), (g), (h), or a combination thereof, is selected to heat waste material having a specific heat of about 0.2 to about 0.6 BTU/lb/degree Farenheit to a desired temperature.

14. The method of claim 1 wherein the period of time in step (f), (g), (h), or a combination thereof, is selected based on the intensity of the infrared source, the desired increase in temperature, and the plastic waste specific heat of about 0.2 to about 0.6 BTU/lb/degree Farenheit.

15. The method of claim 1 wherein step (f), (g), (h), or a combination thereof, is carried out at a pressure above about 1 atm.

16. The method of claim 1 wherein step (f), (g), (h), or a combination thereof, is carried out at a pressure above about 2 atm.

17. The method of claim 1 wherein step (f), (g), (h), or a combination thereof, is carried out at the one or more frequencies, at the one or more intensities, and over the period of time, effective to melt plastic present in the plastic waste.

18. The method of claim 1 wherein step (f), (g), (h), or a combination thereof, is carried out for a period of time effective to remove moisture present in the plastic waste.

19. The method of claim 1 wherein step (f), (g), (h), or a combination thereof, is carried out for a period of time effective to sterilize the plastic waste.

20. The method of claim 1 wherein step (f), (g), (h), or a combination thereof, is carried out for a period of time effective to render the plastic waste chemically inert.

21. The method of claim 1 wherein the infrared (IR) energy in any or all of the steps is applied in a pulsating manner.

22. The method of claim 1 wherein the infrared (IR) energy in any or all of the steps is applied in a continuous manner.

23. The method of claim 1 wherein the infrared (IR) energy in any or all of the steps is applied directly to the plastic waste.

24. The method of claim 1 wherein the infrared (IR) energy in any or all of the steps is applied indirectly to the plastic waste.

25. The method of claim 1 wherein the plastic has a melting point of about 150° C. to about 280° C.

26. The method of claim 1 wherein the plastic has a melting point of about 170° C. to about 260° C.

27. The method of claim 1 wherein the plastic has a combustion point of about 200° C. to about 325° C.

28. The method of claim 1 wherein the plastic has a combustion point of about 220° C. to about 300° C.

29. The method of claim 1 wherein more than about 50 kilograms of waste stream per hour are recycled.

30. The method of claim 1 wherein up to about 15 million kilograms of waste stream per year are recycled.

31. The method of claim 1 wherein the plastic waste comprises one type of plastic, having a melting point and a combustion point.

32. The method of claim 1 wherein the plastic waste comprises multiple types of plastic, each independently having a melting point and a combustion point.

33. The method of claim 1 wherein the plastic waste comprises multiple types of plastic, each independently having a melting point and a combustion point that is substantially the same as the melting point and combustion point of another type of plastic present therein.

34. The method of claim 1 wherein the plastic waste comprises multiple types of plastic, each independently having a melting point and a combustion point that are substantially different from the melting point and combustion point of the other types of plastic present therein.

35. The method of claim 1 wherein the recycled plastic, the reduced plastic, or the combination thereof comprises sterile plastic.

36. The method of claim 1 wherein the recycled plastic, the reduced plastic, or the combination thereof comprises inert plastic.

37. The method of claim 1 wherein the recycled plastic, the reduced plastic, or the combination thereof is a flake or flakes of plastic.

38. The method of claim 1 wherein the recycled plastic, the reduced plastic, or the combination thereof is a briquette or briquettes of plastic.

39. The method of claim 1 wherein more than about 50 kilograms per hour of the recycled plastic, the reduced plastic, or the combination thereof are obtained.

40. The method of claim 1 wherein more than about 500 kilograms per hour of the recycled plastic, the reduced plastic, or the combination thereof are obtained.

41. The method of claim 1 wherein the recycled plastic, the reduced plastic, or the combination thereof comprises plastic in more than about 70 wt. %.

42. The method of claim 1 wherein the recycled plastic, the reduced plastic, or the combination thereof comprises plastic in more than about 80 wt. %.

43. The method of claim 1 wherein the recycled plastic, the reduced plastic, or the combination thereof comprises plastic in more than about 90 wt. %.

44. The method of claim 1 wherein the recycled plastic, the reduced plastic, or the combination thereof further comprises a contaminant selected from the group of household contaminants, agricultural contaminants, and industrial contaminants.

45. The method of claim 1 wherein the recycled plastic, the reduced plastic, or the combination thereof further comprises a contaminant selected from the group of food residue, drink residue, paper, animal soiling, human soiling, blood tissue, effluence, waste vegetable contamination, cleaning fluids, household chemicals, silage, grass, general vegetation residue, animal slurry, fertilizer, chemicals, crossed link polymers, and lubricants.

46. The method of claim 1 further comprising casting the heated plastic in a mold or cast.

47. The method of claim 1 wherein the reducing of the volume of the plastic waste comprises reducing the volume of the plastic waste by up to about 90%.

48. The method of claim 1 wherein the reducing of the volume of the plastic waste comprises removing up to about 90% of moisture present in the plastic waste.

49. The method of claim 1 wherein the weight ratio of the plastic waste to the recycled plastic, the reduced plastic, or the combination thereof is less than about 50%.

50. The method of claim 1 wherein the weight ratio of the plastic waste to the recycled plastic, the reduced plastic, or the combination thereof is less than about 10%.

51. The method of claim 1 wherein the weight ratio of the plastic waste to the recycled plastic, the reduced plastic, or the combination thereof is less than about 5%.

52. The method of claim 1 wherein steps (a) through (i) are carried out in the order recited therein.

53. A recycled plastic prepared by the process of claim 1.

54. A recycled non-plastic prepared by the process of claim 1.

55. The recycled waste material of claim 53 or 54 useful for at least one of a building material, a fuel additive, a fuel having a calorifinic value of at least 40 mJ/kg, a fuel accelerant, clothing fiber, a tote bag, furniture, a carpet, a new beverage container, a detergent bottle, an oil bottle, a vitamin bottle, a drain pipe, a recycling bin, a dog house, plastic lumber, packaging material, a binder, a mat, a deck, paneling, a roadway gutter, a mud flap, a speed bump, an envelope, a trash can, a trash liner, furniture, flooring tile, a compost bin, lumber, a signal light, a car battery component, a broom, a brush, an oil funnel, an ice scraper, a bike rack, a pallet, a storage bin, a tray, a thermometer, a switch plate, insulation, foam packaging, an egg carton, and a vent.

56. A method comprising:
(a) separating a waste stream that includes plastic waste, such that at least a portion of non-plastic waste, unplasticized polyvinyl chloride (UPVC), plastics treated with a fire retardant, or a combination thereof is separated from the waste stream, thereby providing a plastic waste;

(b) analyzing the plastic waste, in which analyzing includes:
  projecting an infrared light through the plastic waste to one or more detectors sufficient to provide a spectral content, the infrared light having at least two distinct frequency components;
  analyzing the spectral content of the infrared light transmitted through the plastic waste; and
  comparing the spectral content of the infrared light transmitted
    through the plastic waste to known spectral content profiles for two or more materials to determine which of the two or more materials comprise the plastic waste;
(c) contacting the plastic waste with infrared (IR) energy at one or more frequencies and at one or more intensities, over a period of time effective to heat plastic present in the plastic waste; and
(d) contacting the plastic waste with infrared (IR) energy at one or more frequencies and at one or more intensities, over a period of time effective to reduce the weight of the plastic waste;
thereby effectively providing recycled plastic, reduced plastic, or a combination thereof.

57. The method of claim 56, further comprising reducing the size of the plastic waste.

58. The method of claim 56, further comprising contacting the plastic waste with infrared (IR) energy at one or more frequencies and at one or more intensities, over a period of time effective to alter the volume of the plastic waste.

59. The method of claim 56, further comprising removing solid particles, organic matter, contaminants, metal contaminants, or a combination thereof, from the plastic waste.

60. The method of claim 56, further comprising cooling the heated plastic waste.

61. The method of claim 56, further comprising calibrating an infrared (IR) source to the plastic waste.

62. A method comprising:
(a) separating a waste stream that includes plastic waste, such that at least a portion of non-plastic waste, unplasticized polyvinyl chloride (UPVC), plastics treated with a fire retardant, or a combination thereof is separated from the waste stream, thereby providing a plastic waste;
(b) analyzing the plastic waste, in which analyzing includes:
  projecting an infrared light having at least two distinct spectral frequency components through free space to an infrared light detector;
    determining the spectral intensity of light received at the infrared light detector through free space;
  projecting the infrared light having at least two distinct spectral frequency components through the plastic waste to one or more detectors;
    determining the spectral intensity of light received at the infrared light detector through the plastic waste; and
  deriving spectral absorption data for the waste material by comparing the spectral intensity of light received through free space to the spectral intensity of light received through the plastic waste;
(c) contacting the plastic waste with infrared (IR) energy at one or more frequencies and at one or more intensities, over a period of time effective to heat plastic present in the plastic waste; and
(d) contacting the plastic waste with infrared (IR) energy at one or more frequencies and at one or more intensities, over a period of time effective to reduce the weight of the plastic waste;
thereby effectively providing recycled plastic, reduced plastic, or a combination thereof.

63. The method of claim 62, further comprising reducing the size of the plastic waste.

64. The method of claim 62, further comprising contacting the plastic waste with infrared (IR) energy at one or more frequencies and at one or more intensities, over a period of time effective to alter the volume of the plastic waste.

65. The method of claim 62, further comprising removing solid particles, organic matter, contaminants, metal contaminants, or a combination thereof, from the plastic waste.

66. The method of claim 62, further comprising cooling the heated plastic waste.

67. The method of claim 62, further comprising calibrating an infrared (IR) source to the plastic waste.

68. A method comprising:
(a) separating a waste stream that includes plastic waste, such that at least a portion of non-plastic waste, unplasticized polyvinyl chloride (UPVC), plastics treated with a fire retardant, or a combination thereof is separated from the waste stream, thereby providing a plastic waste;
(b) analyzing the plastic waste, in which analyzing includes:
  projecting an infrared light through the plastic waste to one or more detectors sufficient to provide a spectral content, the infrared light having at least two distinct frequency components;
  analyzing the spectral content of the infrared light transmitted through the plastic waste; and
  comparing the spectral content of the infrared light transmitted through the plastic waste to known spectral content profiles for two or more materials to determine which of the two or more materials comprise the plastic waste;
(c) calibrating an infrared (IR) source to the plastic waste, in which the calibrating includes:
  estimating a composition of the plastic waste and a weight of the plastic waste, and deriving an infrared exposure from the composition and weight;
(d) contacting the plastic waste with infrared (IR) energy at one or more frequencies and at one or more intensities, over a period of time effective to heat plastic present in the plastic waste;
thereby effectively providing recycled plastic, reduced plastic, or a combination thereof.

69. The method of claim 68, further comprising contacting the plastic waste with infrared (IR) energy at one or more frequencies and at one or more intensities, over a period of time effective to alter the volume of the plastic waste.

70. The method of claim 68, further comprising reducing the size of the plastic waste.

71. The method of claim 68, further comprising cooling the heated plastic waste.

72. The method of claim 68, further comprising removing solid particles, organic matter, contaminants, metal contaminants, or a combination thereof, from the plastic waste.

73. The method of claim 68, wherein derived infrared exposure comprises determining at least one of time of exposure and intensity of infrared light.

74. The method of claim 68, further comprising contacting the plastic waste with infrared (IR) energy at one or more frequencies and at one or more intensities, over a period of time effective to reduce the weight of the plastic waste.

* * * * *